(12) United States Patent
Lau

(10) Patent No.: US 10,174,966 B2
(45) Date of Patent: Jan. 8, 2019

(54) ENERGY SAVING CONTROLLER

(71) Applicant: James Leych Lau, Orange, CA (US)

(72) Inventor: James Leych Lau, Orange, CA (US)

( * ) Notice: Subject to any disclaimer, the term of this patent is extended or adjusted under 35 U.S.C. 154(b) by 0 days.

(21) Appl. No.: 15/787,672

(22) Filed: Oct. 18, 2017

(65) Prior Publication Data
US 2018/0038611 A1    Feb. 8, 2018

Related U.S. Application Data

(63) Continuation-in-part of application No. 14/628,159, filed on Feb. 20, 2015, which is a continuation-in-part
(Continued)

(51) Int. Cl.
| | |
|---|---|
| *F24F 11/30* | (2018.01) |
| *F24F 11/77* | (2018.01) |
| *F24D 19/10* | (2006.01) |
| *G05D 23/19* | (2006.01) |
| *F24F 11/74* | (2018.01) |
| *F24F 11/70* | (2018.01) |

(Continued)

(52) U.S. Cl.
CPC .......... *F24F 11/77* (2018.01); *F24D 19/1039* (2013.01); *F24D 19/1084* (2013.01); *F24F 11/30* (2018.01); *F24F 11/70* (2018.01); *F24F 11/74* (2018.01); *F24F 11/76* (2018.01); *F24F 11/81* (2018.01); *F24F 11/88* (2018.01); *G05D 23/1931* (2013.01); *F24F 11/46* (2018.01); *F24F 2110/10* (2018.01); *Y02B 30/746* (2013.01)

(58) Field of Classification Search
CPC ............ F24F 11/30; F25B 49/02; F25B 49/00
See application file for complete search history.

(56) References Cited

U.S. PATENT DOCUMENTS

| | | |
|---|---|---|
| 5,582,233 A | 12/1996 | Noto |
| 5,650,697 A | 7/1997 | Imagi et al. |

(Continued)

OTHER PUBLICATIONS

Adjustable Speed Drive, Wikipedia, retrieved from the internet Oct. 10, 2018 <URL: https://en.wikipedia.org/wiki/Adjustable-speed_drive>.*

(Continued)

*Primary Examiner* — Ljiljana Ciric
*Assistant Examiner* — Alexis Cox
(74) *Attorney, Agent, or Firm* — Cionca IP Law P.C.; Marin Cionca

(57) ABSTRACT

An energy saving controller for an air handler having a heater and a dual speed fan adapted to switch between a first speed and a second higher speed via a gas furnace controller, the energy saving controller being configured to be mounted between a thermostat and the gas furnace controller, and having: input terminals configured to connect to corresponding thermostat output terminals and receive output signals; a microcontroller configured to: process the output signals into revised signals; and cause the gas furnace controller to alternate between the first speed and the second higher speed to mimic a behavior of a variable speed fan; drivers configured to receive the revised signals and use the revised signals to actuate mechanical relays; wherein the mechanical relays are configured to actuate the fan or the compressor via ESC output terminals.

20 Claims, 11 Drawing Sheets

Related U.S. Application Data of application No. 14/016,012, filed on Aug. 30, 2013, now Pat. No. 9,410,713, application No. 15/787,672, filed on Oct. 18, 2017, which is a continuation-in-part of application No. 15/093,669, filed on Apr. 7, 2016, which is a continuation-in-part of application No. 14/016,012, filed on Aug. 30, 2013, now Pat. No. 9,410,713, application No. 15/787,672, filed on Oct. 18, 2017, which is a continuation-in-part of application No. 15/344,483, filed on Nov. 4, 2016, which is a continuation-in-part of application No. 14/016,012, filed on Aug. 30, 2013, now Pat. No. 9,410,713, application No. 15/787,672, filed on Oct. 18, 2017, which is a continuation-in-part of application No. 14/332,714, filed on Jul. 16, 2014, now abandoned, which is a continuation-in-part of application No. 14/016,012, filed on Aug. 30, 2013, now Pat. No. 9,410,713.

(51) Int. Cl.
| | |
|---|---|
| *F24F 11/81* | (2018.01) |
| *F24F 11/76* | (2018.01) |
| *F24F 11/88* | (2018.01) |
| *F24F 110/10* | (2018.01) |
| *F24F 11/46* | (2018.01) |

(56) References Cited

U.S. PATENT DOCUMENTS

| | | | | |
|---|---|---|---|---|
| 8,752,771 | B2 | 6/2014 | Warren et al. | |
| 9,207,001 | B1* | 12/2015 | Roth | F25D 17/06 |
| 9,417,005 | B1* | 8/2016 | Roth | F25D 17/06 |
| 2003/0041605 | A1* | 3/2003 | Butcher | F24F 11/30 |
| | | | | 62/175 |
| 2007/0267508 | A1* | 11/2007 | Hoglund | G05D 23/1902 |
| | | | | 236/49.1 |
| 2008/0015739 | A1* | 1/2008 | Wacker | F24F 11/30 |
| | | | | 700/276 |
| 2009/0261174 | A1* | 10/2009 | Butler | F24F 11/30 |
| | | | | 236/51 |

OTHER PUBLICATIONS

Analog Devices: MT-101 Decoupling Techniques copyright 2009.
Principles of Electrical Engineering, by Vincent Del Toro, Second Edition 1972 at pp. 395-396.
ST Microelectronics application note: AN442 Application Note: Triac & Microcontrollers: The Easy Connection, copyright 2004.
The Art of Electronics, Horowitz & Winfieli, Second Edition 1989 pp. 8, 14, 45, 48, 566, 578.
Thermostatic Wiring Principles by Bob Scaringe, copyright 2011.
Mowris, R. Apr. 4, 2012. "Work Paper SCG0077 California HVAC Upgrade: Efficient Fan Controller® (EFC®)—Residential," US Copyright Office registration No. TX 8-187-702.
IBM Customer Engineering Manual of Instruction: Transistor Components, copyrighted 1959, 1960 by International Business Machines.
Walsh, John, Declaration of John Walsh Under 37 C.F.R. 1.132, 1 page, Apr. 4, 2017.
Walsh, John, GreenFan Probe Video Transcript, 11 p. May 19, 2011, YouTube.
Carrier, Installation, Start-up, and Service Instructions 58GA, 15 p., 1973, Carrier HVAC Partners.
Mowris, Robert, Declaration of Robert Mowris Under 37 C.F.R. 1.132, 1 page.
USPTO, Certificate of Registration for Work Paper PGE0077 California HVAC Upgrade: Efficient Fan Controller, 1 page, Jun. 16, 2016, USPTO, Washington, D.C.
Mowris, Robert, Work Paper PGE0077 California HVAC Upgrade: Efficient Fan Controller, 40 pages, published Mar. 21, 2012, Copyright Registration No. TX-8-247-632.
Green, Kenneth L., Summary of Prior Art, Third Party Submission Under 37 CFR 1.290 in U.S. Appl. No. 14/332,714.
Concise Description of Relevance, Third Party Submission Under 37 CFR 1.290 in U.S. Appl. No. 14/332,714, 7 pages.

\* cited by examiner

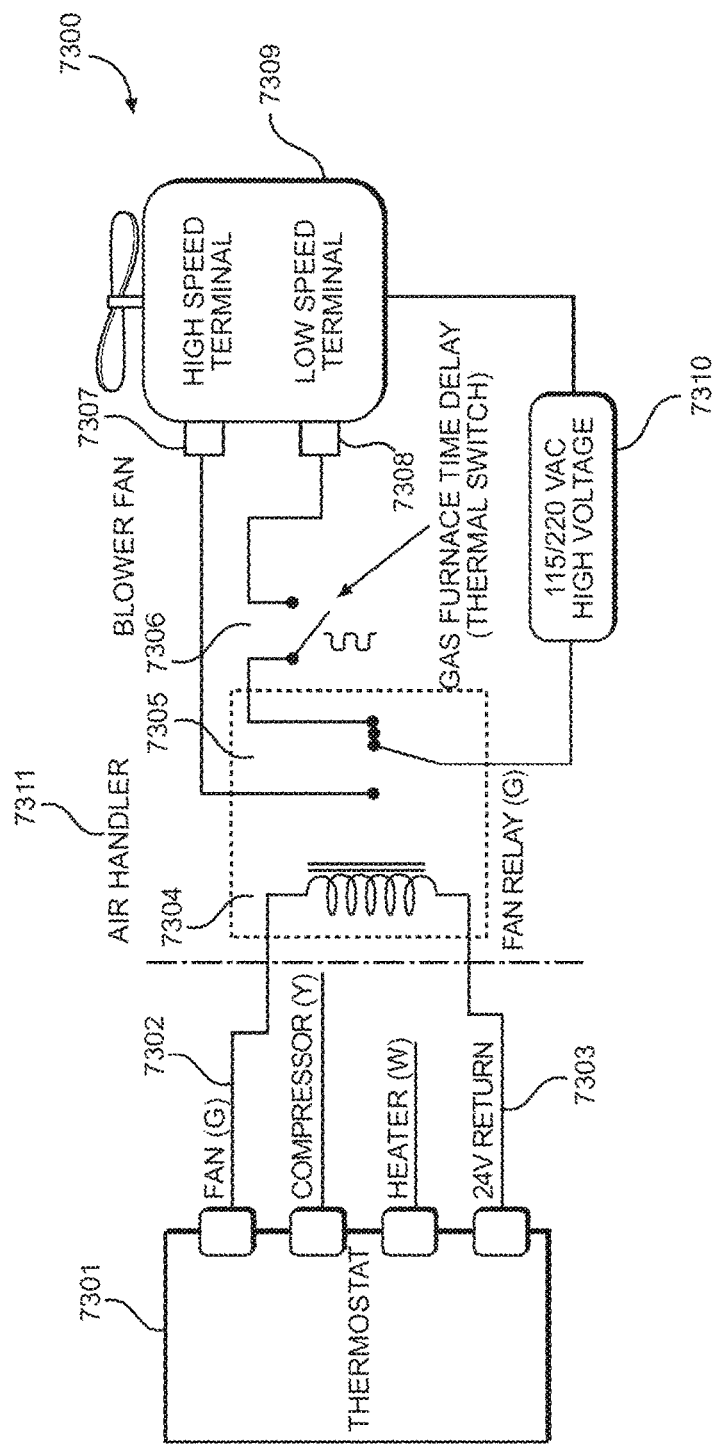
FIG. 7A - Prior Art

ENERGY SAVING CONTROLLER

CROSS-REFERENCE TO RELATED APPLICATIONS

This application is a continuation-in-part and claims the benefit of U.S. Non-Provisional application Ser. No. 14/016,012, filed Aug. 30, 2013 (U.S. Pat. No. 9,410,713), U.S. Non-Provisional application Ser. No. 14/332,714, filed Jul. 16, 2014, U.S. Non-Provisional application Ser. No. 14/628,159, filed Feb. 20, 2015, and U.S. Non-Provisional application Ser. No. 15/093,669 filed Apr. 7, 2016, and U.S. Non-Provisional application Ser. No. 15/344,483, filed Nov. 4, 2016, which are hereby incorporated by reference, to the extent that they are not conflicting with the present application.

BACKGROUND OF INVENTION

1. Field of the Invention

The invention relates generally to energy saving devices and methods for HVAC systems and particularly to a HVAC (Heating Ventilating and Air Conditioning) energy saving controller (ESC) to:

A) Predict and extend the fan run time of HVAC systems after the heating or cooling unit has shut off and/or B) Stop the compressor or heater for a short duration of time, with the fan still blowing, if the compressor or heater has been running continuously for fixed or variable periods of time.

D) To modulate the gas furnace blower fan so that it alternates between low speed and high speed on a continuously basis in the same cycle, and E) The ability to shut off or bypass the ESC in extreme temperatures by determining where the ESC is installed using a low-cost temperature sensor embedded into the ESC.

2. Description of the Related Art

Conventional HVAC (Heating Ventilating and Air Conditioning) systems include temperature changing components for changing the temperature and condition of air. Indoor air handlers drive air from the temperature changing component through supply ducts to zones within a building. A typical HVAC consists of a heating unit, an air conditioning or cooling unit or heat pump unit, and the fan blower at the air handler unit. A thermostat is used to control the conditions of the air in a conditioned space by sending control signals to the HVAC's high voltage relays or contactors to activate or deactivate one or more of the temperature changing components.

Conventional HVAC fan controllers typically run the ventilation blower fan for an additional 0 second to 90 seconds after the heater or air conditional compressor has been turned off. For example, most furnace heat exchangers are still hot (above 135 to 210 degrees F.) after the furnace fan turns off. This wasted energy is not delivered to the conditioned space when the fan stops blowing. The ESC recovers the remaining heat energy from the hot furnace heat exchanger after the furnace turns off and delivers this heat to the conditioned space. The ESC works by hijacking the fan control signals emitted by the thermostat and replace it with the new fan control signal emitted by the ESC itself. In this way, the HVAC fan controller only receives the fan control signals from the ESC itself and not from the thermostat directly. When the thermostat sends out the fan activate or deactivate command signal, it goes only to the ESC. The ESC reads this command and commands from the other environmental conditions plus from the HVAC components and computes the additional fan run time. Then, the ESC sends the adjusted command signal to the HVAC fan controller requesting it to run for a predicted additional extended time. Therefore, the ESC depends on the fan command signal emitted by the thermostat as source of input. The command signal of a thermostat is either a high of 24 vac or 0 vac (ground). Correspondingly, the ESC accepts either 24 vac or 0 Vac as its inputs.

For the ESC to work universally, it has to interface with every manufacturer of thermostats used in HVAC system. There are many manufacturers of thermostats where the fan output command signal goes into a floating or unknown state when the thermostat is shut off by putting the thermostat switch to system off. In such a case, if an ESC is connected to the thermostat, the fan command signal being in to unknown state could be read in as ON state, and the ESC will turn the fan on and run continuously. Therefore, there is a need to have a circuit in the ESC circuitry to read any unknown or floating signals from the thermostat fan command signal as known 24 vac or 0 vac state. In this way, the fan will always be turned off when it is not at an ON state.

Studies have shown that even after this built-in short additional fan run extension, the furnace surface and the air conditioner cooling coil still have some energy left.

Studies have also shown that if the cooling unit has been running continuously for a period of 20 minutes to 30 minutes, the cooling coil is wet and the evaporation of the water from the wet coil can provide additional cooling energy that can be harnessed. Also, if the heating unit has been running continuously for a period of approximately 20 to 30 minutes, the furnace is at its maximum temperature, and by shutting down the furnace for a short period of time while still allowing air flow through it, it will not only reduce the furnace temperature, therefore extending its life, but also harvest some residual heat energy for the conditioned room.

The ESC will adjust the fan operation automatically for heating based on gas furnace operating time or Heat Pump operating time. For air conditioning, the same ESC will adjust fan operation automatically for cooling based on air-conditioning compressor run time. The amount of time the fan continues to operate after the furnace is off or after the air conditional compressor is off, varies with the amount of time the furnace or compressor are running or not running using a microprocessor and firmware. The furnace additional fan run time indicates how much residual heat is left in the heat exchanger and the rate of temperature drop inside the room. The air conditioner compressor additional run time indicates how much cold water is condensed on the evaporator coil, and the rate of temperature rise inside the room. Hence, the ESC recovers and delivers left over residual energy to the conditioned space than is possible with original HVAC thermostat alone. The ESC improves the efficiency of HVAC equipment by delivering additional heating or cooling capacity for a small amount of additional electric energy (kWh).

For a subset of HVAC systems, where the heating element is a gas furnace, the thermostat setting is selected to "GAS." In such applications, the thermostat will not energize the low voltage (24 Vac) fan output typically designated as the green wire. Instead the furnace control board controls the blower fan directly at the high voltage side of the blower fan contactor though an adjustable time delay relay or thermal switch. There are many types of blower fan motors in used in the HVAC industry. A popular type is a fan blower that uses a motor with variable speed. Another popular type is a fan blower motor that uses a fixed single speed. Yet another popular type is a fan blower motor that uses fixed multiple speeds such as low speed for the heat cycle and high speed for the cool cycle. For fan blower motors with 2 fixed speeds, the motor has 2 electrical tabs, one tab connected to energize low speed and another to energize high speed.

It has been shown by many studies that by using a variable speed blower fan, a better efficiency in the delivery of heats to the conditioned space can be achieved. However, replacing a multiple fixed speeds motor with a variable speed motor is expensive. Since the thermostat fan 24 Vac output controls the relay connections to high speeds tap of the blower fan motor, it is possible to vary the speed of the blower fan speed over the same heating cycle by pulsing the ESC's 24 Vac fan output so that it alternates from activation and de-activation of this fan line input into the 24 Vac relay control coil. This will have the effect of turning on a higher speed when the thermostat fan signal (green wire) is activated and defaulting to lower speeds when the thermostat fan signal is de-activated during the same gas heating cycle. This is a low-cost solution to replacing a multi-fixed speed blower fan motor with a more energy efficient variable speed blower fan motor.

While extending the fan run time after the heater or air conditioner has turned off and/or resting the compressor after 30 minutes or more of continuous runs may save energy, it may also cause discomfort to the occupants or users when the outside air temperatures are very high or very low. For example, during the peak of summer, the outside air temperature in some parts of the country could be over 120 degrees F. Similarly, during the very cold winter, the outside air temperature could be at −40 degrees F. In such cases, it will cause discomfort to the occupants with the fan extension run time which may be blowing hot air or cold air into the conditioned space.

Therefore, there is a need for an energy saving controller to have the ability to bypass or disable the fan extension or compressor rest when the outside air temperatures are at its extremes such as a heat wave during the summer or a cold front moving in during the winter.

There is also a need for an energy saving controller that can easily be inserted between the thermostat and the air handler of an HVAC system to recover additional heating and cooling capacity and operate the HVAC equipment at a higher efficiency with the ability to vary the furnace blower fan speed for even more efficiency, plus the ability to shut off the fan extension's run time and compressor's rest time during those times when the outside air temperatures are at its extremes.

There are many manufacturers of thermostats where the fan output command signal goes into a floating or unknown state when the thermostat is shut off by putting the thermostat switch to system off. In many cases, when the thermostat malfunctions, one of more of its outputs goes into a high impedance state or a float state or open circuit. When a thermostat is connected directly to the air handler unit, a high impedance state or a float state will not activate the HVAC relays or contactors and therefore, the HVAC system will remain off.

There are products in the market that are connected between the thermostat and the air handler unit controllers that cannot handle a floating state as inputs. A common case is the thermostat fan output signal being in unknown state when the thermostat is switched to OFF. These products would read this as ON state, and will turn the fan on and run continuously.

Therefore, there is a need to have a circuit to read any unknown or floating signals from the thermostat fan, cool or heat command signal as known 24 Vac or 0 Vac state. In this way, the fan, compressor or heater will always be turned off when it is not at an ON state. Further, it would be desirable to provide a low cost controller installed between the thermostat and the air handler that will work for the majority of the thermostats in the market, that it would solve the floating state of the thermostat output signal after the thermostat is turned off and keeps the HVAC in OFF state, and that could be easily installed and operated by the user.

Additionally, to minimize the limitations found in the prior art, there is a need for a ESC device that can be connected between an existing thermostat and the air handler of an HVAC system where the blower fan speed can be made to alternate between low speed and high speed on a continuous basis over the duration of the same gas furnace run time, and to extend to the fan run time after the gas furnace has shut down to blow the residual energy left at the furnace into the conditioned room. Additionally, there is a need to be able to bypass or disable the fan extension or compressor rest or heater rest when the temperature of the air outside is at its extremes.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a new plug and play energy saving controller i.e. ESC (which may be referred to as "HVAC CHIP" in this application) is provided to predict the fan run time extension of HVAC systems based on past behaviors of the heating or cooling unit on and off cycles, having the ability to shut off and/or pause the compressor or heater (with the fan still blowing) for a short duration of time if the compressor/heater has been running continuously for a period of time. Thus, an advantage is the harnessing of otherwise wasted residual energy from the HVAC systems. Monitoring the behavior of previous cycle(s) for the compressor or heater on and off durations gives a better, more intelligent, comprehensive and efficient fan extension period, to save more energy.

Anyone skilled in the art will know that when the compressor is turned on, the fan will automatically be turned on as well. In fact, in most thermostat designs in the market, a common switch is used for the compressor and the fan such that when this compressor switch is turned on when there is a call for cool air, the fan is automatically energized as well. Therefore, anyone skilled in art of HVAC knows that the behavior of the previous cycles of the compressor can also be determined from monitoring the fan run time. The fan not turning on while the compressor is running indicates a complete malfunction of an HVAC system, as the compressor will freeze up without the fan performing its critical role of heat exchanging.

Keeping the fan running and shutting down or temporarily resting the compressor or heater if they run continuously for a fixed or a calculated variable period of time and the duration of the rest period can all be based on an algorithm, and this will act like a fan extension and it saves energy. The algorithm can be derived from sensors placed on the compressor coil to measure the coil's humidity during the air conditioning cycle or sensors placed at the primary or secondary heat exchanger to sense their temperature such that the compressor/heater rest terminates as soon as the energy left in these elements has been dissipated by the blowing of air across them.

In another aspect, the new plug and play HVAC CHIP controller can be inserted at any points along the wires between the thermostat and the air handler unit. Thus, another advantage is the ease of installation of the controller. Since the HVAC CHIP can be inserted at any point along the thermostat wiring path, it is possible that the HVAC CHIP could be installed inside the room to be conditioned, such as behind the thermostat inside the dry wall, or could be attached below the thermostat or mounted next to the thermostat. It can also be installed outside of the conditioned space such as in the attic or at the air handler unit itself or at the roof top unit. The air handler unit itself sometimes is also located at the attic, at the garage or inside the building itself. It would be useful if the HVAC CHIP can determine autonomously whether it has been installed inside the conditioned space or outside the conditioned space. This information can be used to determine the condition of the environment; namely, the air temperature inside or outside of the conditioned space.

Thus, in another aspect, a low-cost temperature sensor can be embedded into the HVAC CHIP such that the temperature sensor itself is exposed to the immediate environment where the HVAC CHIP is installed. By processing the temperature data collected by this sensor, the HVAC CHIP can autonomously determine the location of its installation. For example, if this sensor is reporting continuously approximately the same temperature value (within normal+/−tolerance) to the microcontroller (MCU), while the heating or cooling cycle is on, then the HVAC CHIP knows that it is installed outside of the conditioned space. This is because the temperature outside of the conditioned space will not be affected by the HVAC's cooling or heating cycles. If this sensor is reporting a decreasing temperature values while the cooling compressor is running, or an increasing temperature values when the heater is running, then the HVAC CHIP knows it is installed inside the conditioned space. By knowing this installed location information, the HVAC CHIP can determine when to bypass the energy saving features of fan extension or compressor/heater rest when the outside air temperature is at its extremes by using software.

In the same manner, other sensors such as humidity sensors, light sensors, pressure sensors, air flow sensors, motion sensors, sound sensors, wave sensors, etc., all can be embedded into the HVAC CHIP to measure these conditions in the immediate vicinity of the HVAC CHIP's installed location, and each can be used as a stand-alone sensor, or a plurality of sensors can be used in combination with each other, to report other conditions that may be required to improve the functionality of the HVAC CHIP and to improve the comfort level of the occupants.

In another aspect, the controller can be made as part of the thermostat itself such that there is no need to have a separate device be connected between the thermostat and the air handler unit. In this case, the HVAC CHIP can share the thermostat's temperature probe.

In another aspect, the controller can be made as part of the air handler unit control board itself such that there is no need for a separate device to be connected between the thermostat and the air handler unit. In this case, the embedded temperature sensor can report the outside air temperature to the MCU for making decisions on whether or not to activate the energy saving features in real time or on the fly.

In another aspect, when in the gas furnace heating cycle, the new plug and play HVAC CHIP controller is configured to modulate the 24 vac fan line such that the gas blower motor speed can be configured to modulate between low speed and high speed continuously in the same heating cycle to provide better comfort to the user or occupant of the conditioned space and further increase efficiency. An advantage may be that by energizing and de-energizing the Air Handler Unit's fan contactor, and due to motor inertia, the blower fan speed can be made to vary from high to low just like a variable speed fan to further improve efficiency as shown in FIG. 8.

In another aspect, an energy saving controller (ESC) for an air handler for conditioning air of a space is provided, the air handler having a dual speed fan adapted to switch between a first speed and a second higher speed via a gas furnace controller and at least a member of a group consisting of a gas heater, the ESC being configured to be mounted between a thermostat and the gas furnace controller, and comprising: a plurality of input terminals configured to connect to a corresponding plurality of thermostat output terminals and receive thermostat output signals from the thermostat; a floating state detector being connected to the plurality of input terminals, and being configured to detect when a floating state signal is outputted by the thermostat; a microcontroller connected to the floating state detector, the microcontroller being configured to: process the floating state signal into an OFF state, process the received thermostat output signals into a set of revised energy saving signals; and cause the gas furnace controller to alternate between the first speed and the second higher speed to mimic a behavior of a variable speed fan; a plurality of drivers connected to the microcontroller and also connected to a plurality of mechanical relays, the plurality of drivers being configured to receive the set of revised energy saving signals from the microcontroller and to use the set of revised energy saving signals to actuate the plurality of mechanical relays; wherein the plurality of mechanical relays is configured to actuate the dual speed fan via a plurality of ESC output terminals; a power source for powering the plurality of mechanical relays, the microcontroller, and the plurality of drivers; and wherein the alternation between the first speed and the second higher speed is caused by: defaulting to making electrical contacts with and provide line voltage to a first fan speed terminal to run the dual speed fan at the first speed, and, when the second higher speed is needed, energizing a control coil of the air handler, the control coil being connected to a two-pole contactor configured to break the electrical contacts with the first fan speed terminal and make the electrical contacts with and provide line voltage to a second higher fan speed terminal to run the dual speed fan at the second higher speed; and a temperature sensor embedded in the energy saving controller, the temperature sensor being configured to provide temperatures detected at an installation location of the energy saving controller to the microcontroller; wherein the microcontroller is further configured to: determine that the installation location is inside of the space if the detected temperatures follow a pattern of rising when a heating cycle is on or a pattern of falling when a cooling cycle is on, and cause the alternation; or determine that the installation location is outside of the space if the temperature changes do not follow the pattern of rising when the heating cycle is on or the pattern of falling when the cooling cycle is on, and bypass the alternation when a temperature detected by the temperature sensor is higher than a first predetermined temperature, or when a temperature detected by the temperature sensor is lower than a second predetermined temperature.

In another aspect, an energy saving controller (ESC) for an air handler for conditioning air of a space is provided, the air handler having a heater and a dual speed fan adapted to switch between a first speed and a second higher speed via a gas furnace controller, the energy saving controller being configured to be mounted between a thermostat and the gas furnace controller, and comprising: a plurality of input terminals configured to connect to a corresponding plurality of thermostat output terminals and receive thermostat output signals from the thermostat; a floating state detector being connected to the plurality of input terminals, and being configured to detect when a floating state signal is outputted by the thermostat; a microcontroller connected to the floating state detector, the microcontroller being configured to: process the floating state signal into an OFF state, process the received thermostat output signals into a set of revised energy saving signals; and cause the gas furnace controller to alternate between the first speed and the second higher speed to mimic a behavior of a variable speed fan; a plurality of drivers connected to the microcontroller and also connected to a plurality of mechanical relays, the plurality of drivers being configured to receive the set of revised energy saving signals from the microcontroller and to use the set of revised energy saving signals to actuate the plurality of mechanical relays; wherein the plurality of mechanical relays is configured to actuate the dual speed fan or the compressor via a plurality of ESC output terminals; a power source for powering the plurality of mechanical relays, the microcontroller, and the plurality of drivers; and means for causing the alternation between the first speed and the second higher speed wherein line voltage is provided to either a first fan speed terminal of the dual speed fan or a second higher fan speed terminal of the dual speed fan.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIGS. 7A-7B illustrate an example of a typical connection of a HVAC system, and a typical connection of a HVAC system with the HVAC CHIP interfaced into the system, respectively, according to an aspect.

DETAILED DESCRIPTION

Figure 1:
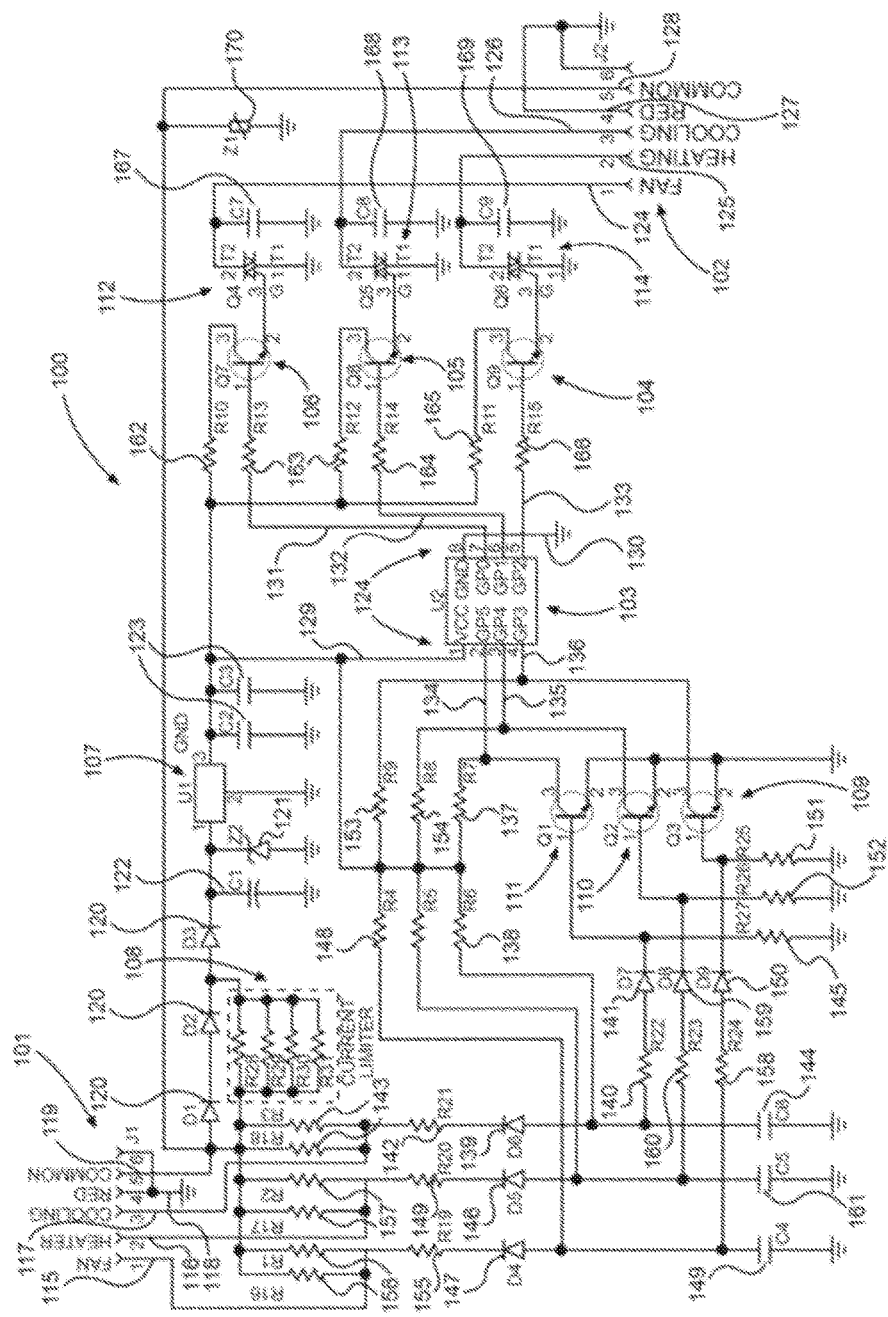
FIG. 1 illustrates a schematic circuit diagram of an integrated circuit for controlling the fan, the compressor and the heater of a heating, ventilation and air conditioning (HVAC) system, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 5100 and 5100-*a*, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates a typical schematic circuit diagram of an integrated ESC circuit 100 for controlling the fan, the compressor and the heater of a heating, ventilation and air conditioning (HVAC) system, according to an aspect. Shown in FIG. 1 as examples are a plurality of input terminals 101 (which includes as examples a first input terminal 115, a second input terminal 116, a third input terminal 117, a fourth input terminal 118, and a fifth input terminal 119), and a plurality of output terminals 102 (which includes as examples a first output terminal 124, a second output terminal 125, a third output terminal 126, a fourth output terminal 127, and a fifth output terminal 128), a voltage regulator 107, a microprocessor 103, transistors 109, 110, 111, 104, 105 and 106, and triacs 112, 113 and 114, transistors 109, 110 and 111, triacs 104, 105, and 106, diodes 120, 139, 146, and 147, current limiter 108, capacitor 122, Zener diode 121, plurality of terminals 124 of the microprocessor 103 (which includes a supply voltage terminal 129, a ground terminal 130, drive output terminals 131, 132, 133, and input terminals 134, 135, 136).

The microprocessor 103 is programmed for energy efficient operation of the HVAC system by extending the fan run time of the HVAC blower fan based on the residual energy left over in the heater elements or in the air conditioning cooling coil and/or the rate of energy transfer (i.e., how fast the room gets heated up again in the case of a cooling cycle, or how fast the room gets cooled down again in the case of a heating cycle), as it will be described in more details hereinafter. The rate of energy transfer may be obtained by monitoring the on-off periods of prior cycles to estimate temperature differences between inside and outside and thus the rate at which the room is heated up or cooled down by its environment during the OFF period after the thermostat sends a command signal to have the HVAC fan shut off. Additionally, if the compressor (or heater, if HVAC system is in heating mode) has been running continuously for a predetermined period, for example, approximately 20-30 minutes, the microprocessor 103 will shut down the HVAC compressor (or heater) for, for example, 3 to 5 minutes while the fan continues to run, even though the thermostat did not send a command signal to have the compressor (or heater) shut down. The above two actions (i.e., extending fan run time and shutting down the compressor or heater briefly) are independent of each other and controlled by the microprocessor 103. Shutting down the compressor or heater if they run continuously for, for example, 30 minutes, but keeping the fan running, will act like a fan extension and it saves energy.

The input terminal 115 voltage changes depending on the ON/OFF position of the fan. The first input terminal 115 is coming from the thermostat fan output command signal (color coded green wire) and has a voltage selected from a group consisting of 24 vac, 0 vac and a floating value. The floating value means that the input terminal 115 is not connected to either 24 vac or 0 vac, and can assume any value. The input terminal 119 always has a common terminal voltage of 24 vac with reference to circuit's 100 ground.

In a typical operation of a thermostat, a 24 vac thermostat output is an OFF state and ground or 0V thermostat output is an ON state. So, the thermostat turns on the fan by outputting a 0 vac to the fan wire, etc. When the thermostat wants to turn OFF the fan, the input (fan) terminal 115 of circuit 100, and the input (common) terminal 119 of circuit 100 both has 24 vac. The reversed biased diode 147 allows negative portion of the 24 vac from input terminal 115, after passing through resistor 155, to be present at the anode of diode 147. The RMS voltage at the anode of diode 147 derived from input terminal 115 in series with resistor 155, is at least a negative 10 Vrms. From input (common) terminal 119, approximately 5 VDC from the voltage regulator 107 in series with resistor 148, is also present at the anode of the diode 147. The resultant of the RMS voltage and the DC voltage is always negative which charges the capacitor 149 with a negative voltage as well. The diode 150 blocks this voltage from the base of transistor 109. The resistor 151 pulls the voltage of the base of transistor 109 to ground and cause the transistor 109 to be in off state. So, the input terminal 136 to microprocessor 103 is approximately 5 vdc high from the output of voltage regulator 107 in series with resistor 153. The microprocessor 103 will manipulate its output 131 to low (0 volt) causing transistor 106 to shut off. This in turn shuts off the triac 112 and causes the circuit 100's fan output terminal 124 to be in high impedance state which turns the HVAC fan to off When the input terminal 115 has 0 vac or ground, and the input (common) terminal 119 has 24 vac, the 24 vac of terminal 119 in series with resistor pairs 156 sinks to ground as the outputs of resistor pair 156 is connected to the input terminal 115 which has 0 vac.

The anode of reverse bias diode 147 is now high from the 5 vdc through resistor 148. The positive voltage at the anode of diode 147 cause the capacitor 149 to be charged to a positive voltage which in turn cause the forward bias diode 150 to conduct and turns on transistor 109. When transistor 109 conducts, the microprocessor 103's terminal 136 becomes low. Microprocessor 103 manipulates its output 131 to high and turns on transistor 106 which in turn turns on triac 112. The circuit 100's output (fan) terminal 124 becomes 0 vac which turns on the fan of the HVAC system.

When the circuit 100's input terminal 115 is in floating state, the input 115 is not connected to either 24 vac or 0 vac. In the floating state, the voltage at terminal 115 is unknown. The voltage at terminal 119 has 24 vac flowing through the pair of parallel resistor 156. The reverse bias diode 147 allows negative portion of this 24 vac to be present at the anode of diode 147 which will charge the capacitor 149 to a negative voltage. The diode 150 blocks the negative voltage to the base of transistor 109, and the resistor 151 pulls the base of transistor 109 to ground turning transistor 109 to off state. This in turn cause a 5 vdc present at terminal 136 of microprocessor 103 which cause 131 to go to low voltage shutting off transistor 106 and putting the triac 112 to off state. The circuit 100's output (fan) terminal 124 stays at high impedance state and the HVAC's fan is at OFF state thereby solving the problem of the floating inputs into terminal 115.

Similarly, the above applies to circuit 100's input (heater) terminal 116 and input (cooling) terminal 117 which can solve the floating states to these inputs.

Figure 2:
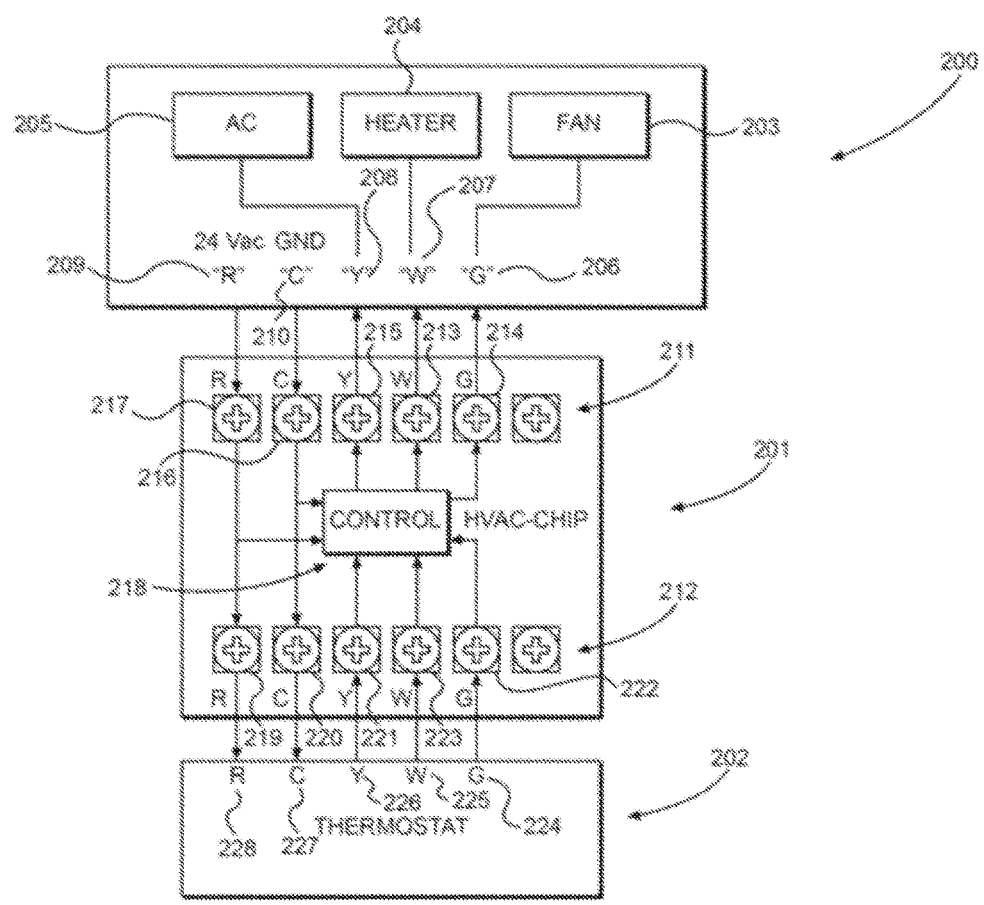
FIG. 2 illustrates a block diagram for controlling the fan, the heater and the AC of a HVAC system using the integrated circuit from FIG. 1, according to an aspect.

FIG. 2 illustrates a block diagram of an integrated circuit 201 (HVAC CHIP) for controlling the fan 203, heater 204 and AC 205 of a HVAC Air Handler Unit 200, according to an aspect. The HVAC CHIP 201 configuration, and more specifically that of its controller 218, may be as that of the integrated circuit from FIG. 1. The HVAC 200 includes an air conditioner (AC) 205, a heater 204 and a fan 203 and the wire color coded green with its terminal 206, wire color coded white with its terminal 207, wire color coded yellow with its terminal 208, wire color coded red with its terminal 209, and a 24 Vac common wire and its terminal 210.

The HVAC CHIP 201 is as shown connected between the thermostat 202 and the HVAC air handler unit 200. The HVAC CHIP 201 includes output connectors 211, input connectors 212 and the controller 218. The output connectors 211 have wire lead terminals or screws terminals 214, 213, 215, 216 and 217 to connect to the HVAC 200. The input connectors 212 have wire lead terminals or screw terminals 222, 223, 221, 220 and 219 to connect to the thermostat.

From the output connector 211, the wire from the G terminal 214 is connected to the G terminal 206 of HVAC 200, wire from W terminal 213 is connected to the W terminal 207 of HVAC 200, wire from Y terminal 215 is connected to the Y terminal 208 of HVAC 200, wire from C terminal 216 is connected to the C terminal 210 of HVAC 200 and the wire from R terminal 217 is connected to the R terminal 209 of HVAC 200.

From the input connector 212, the wire from the G terminal 222 is connected to the G terminal 224 of thermostat 202, wire from W terminal 223 is connected to the W terminal 225 of thermostat 202, wire from Y terminal 221 is connected to the Y terminal 226 of thermostat 202, wire from C terminal 220 is connected to the C terminal 227 of thermostat 202 and the wire from R terminal 219 is connected to the R terminal 228 of thermostat 202.

When the thermostat 202 sends any control command instructions through its fan, heat or cool outputs, these instructions go into the HVAC CHIP 201, which acts as an energy saving controller (ESC) by manipulating these instructions and sending a revised set of energy savings command instructions to the HVAC 200, as disclosed herein.

The HVAC CHIP will adjust the fan operation automatically for heating using an algorithm derived from the stored residual energy left after furnace or heat pump has shut down and the rate at which the temperature of the room is changed by its environment after the heater or air conditioning are in OFF condition. The algorithm will preferably be based on how long the heater has been running, and how long the heater was shut off (on off and on cycle) after the set temperature has been reached, in the multiple previous cycles, and then predict for the next cycle, how long the fan should continue to run based on the data from the previous cycles and preferably the current cycle. So, the fan run time extension is preferably always predicted considering the data collected from the previous one on-off-on cycle or previous multiple on-off-on cycles.

When the thermostat calls for heat, the thermostat heat or "W" output 225 in FIG. 2 goes typically to 0 vac. Input 223 of HVAC CHIP goes to 0 vac, the controller 218 ensure that its output 213 goes to 0 vac which in turn pulls the heater input 'W' 207 of FIG. 2 to activate. This turns on the heater 204 of HVAC 200 in FIG. 2. In a HVAC system, if heater is a gas heater, the thermostat will not activate the fan when there is a call for heat. If the heater is an electric heater or a heat pump, the thermostat will also activate the fan when there is a call for heat.

Assuming an electric heater, when there is a call for heat, the thermostat fan or "G" output 224 in FIG. 2 goes to 0 Vac. The HVAC CHIP controller 218 will then output the same 0 vac to terminal 214 of FIG. 2 which will activate the HVAC fan input 207.

As described above, when there is a call for heat by the thermostat, the input 135 in FIG. 1 goes into a low voltage state. The microprocessor 103 records the duration of input 135 in low voltage state which is the heater ON time. When the room temperature has reached its upper hysteresis set temperature, the thermostat 202 heater output terminal 225 in FIG. 2 goes to 24 vac. This in turn deactivated the heater. In addition, controller 218 also record the duration of input 225 in high voltage state which is the heater OFF time. The software in the controller 218 stores the data of heater previous cycle or many previous cycles ON time and heater previous cycle or many previous cycles OFF time and the current heater current cycle ON time. Then, at the end of the current heater ON cycle the controller 218 takes these data collected over many previous cycle's heater ON time and Off time and the current ON time, and computes or predicts how long its fan output 214 should continue to remain activated to keep the fan ON at the end of current heater ON time.

Since the heater element in the heat exchanger gets to its maximum temperature fairly quickly (e.g., 7 minutes), by the controller 218 measuring the heater ON time it can be determined if the heater has reached its maximum temperature. After the heater elements have shut off, the controller 218 can estimate how much residual energy is left that can still be used to heat up the room, which determines with how much the fan run time should be extended.

In addition, the heater OFF time during the ON-OFF-ON cycle(s) indicates the rate at which the room cools down after the heater is OFF and this depends on the temperature difference between the inside of the conditioned room and the outside ambient and the structure and environment of the room such as wall insulation, number of living occupants, heat generating appliances (electronic or electrical equipment, lights, computers, TV, etc.), and so on. If the heater OFF time is short, the fan extended run time should also be short as it takes faster for the residual heat energy left at the heat exchanger to cool down as well. This also will prevent cool air from circulating in the conditioned room.

As an example, if the room set temperature is 75 degrees F. (75 degrees F.+/−1 degree F as hysteresis), and the outside temperature is 60 degrees F., the heater may run for 20 minutes to get the room reached (76 degrees F.). The heater then shuts off, for let's say 10 minutes, for the room to drop the temperature down to 74 degrees F. and then it turns on again, for let's say 15 minutes. From experiments we have conducted it was determined that most furnaces reached their maximum temperature after 7 minutes of burning. The furnace control board will usually let the fan continue to run for 90 seconds after it has shut down. We shall call this the default fan run time extension. So, an exemplary algorithm is to measure if this 7 minutes has been reached, and assign a 1 (one) minute fan extension, if it has been reached. For the 10 min of heater off, a 20% may be assigned as time extension, or 2 min. For the current heater ON time of 15 min (i.e., over 7 min), another 1 minute may be assigned as time extension. Thus, the total fan time extension is 4 (four) minutes in this example. The algorithm can then compare this total time to see if it is above the default extension time of 90 seconds, and if it is, then it will extend the fan run time with an additional 4 minutes minus 90 seconds, or 2.5 minutes additional fan run time. In the above example, if the heater was OFF for 6 minutes instead of 10 minutes, then the total fan time extension would be 1 min+1.2 min+1 min, which is 3.2 minutes. In this case, the software will ask the fan to extend for 3.2 min minus 90 seconds, or 1.7 minutes additional fan run time.

In addition, to increase the efficiency of the system even further, if the HVAC's heating elements have been operating continuously for a period of time (e.g., 20-30 minutes), they will be shut off or deactivated by the HVAC CHIP for a short period of time (e.g., 3-5 minutes) with the fan still running, to not only reduce the furnace temperature therefore extending its life, but also harvest some residual heat energy for the conditioned room.

For air conditioning, the same HVAC CHIP will adjust fan operation automatically for cooling using an algorithm derived from the residual stored energy left in the water condensed on the cooling coils and the rate at which the conditioned room gets heated up, which depends on a number of factors including the conditioned room's insulation, number of occupants in the room, number of appliances operating in the room, temperature difference between the room and the outside ambient, etc., after the air conditioner has shut down. The algorithm will preferably be based on how long the compressor has been running, and how long the compressor was shut off (on-off-on) in previous cycle or multiple previous cycles. When the thermostat calls for cool, in FIG. 2, thermostat 202 output 226 will go to 0 vac. Since output 226 is connected to terminal 221 of HVAC CHIP 201, the controller 218 will make terminal 215 in FIG. 2 go to 0 vac as well. This then turns on the AC compressor 205 of the HVAC 200. Also, when the thermostat calls for cool, the fan output 224 of thermostat 202 is also in 0 vac which cause the fan 203 of HVAC 200 to be turned on as well. In many thermostat designs, the fan output 224 is tied together with the compressor output 226. The controller 218 records the duration of 221 AC compressor ON and AC compressor OFF. Alternatively, the controller 218 can also record the duration of 224 fan activated or fan deactivated as the proxy for AC compressor status. Then, at the end of the next compressor ON cycle, the software makes its fan output 214 of FIG. 2, to stay on for a predicted period of time after the end of the compressor ON period. This continues on, cycle after cycle, with the fan extension period based on the data collected from the previous compressor ON and OFF cycle or many previous ON and OFF cycles and the current ON cycle. The predicted fan extension run time is computed by the software that uses the data collected from the previous cycle(s)' compressor ON, OFF and ON duration (see example below).

For example, based on an average air humidity of 50%, after the compressor has run for 20 minutes, the average AC condenser coil is typically dripping wet. This will be equivalent to maximum latent cooling energy, which is available when the water condensed in the coil is evaporated away. With the fan blowing, it takes typically approximately 5 to 7 minutes to evaporate the water to dry with a 50% air humidity. So, by measuring how long the compressor is ON and assuming an average of 50% humidity for example, the HVAC CHIP can extrapolate the estimated available energy, and thus, how long the fan run extension should be, from the partially wet condenser coils if the AC is ON for less than 20 mins. For example, if the compressor has run for 10 minutes and the air humidity is 50%, the fun extension time may be 3 minutes. With the data on how long the AC compressor was OFF before it kicks on again, HVAC CHIP can adjust this fan extension time further (see example below). It should be noted that this is for the situation when the compressor is ON for less than preferably 30 minutes continuously. If the compressor was ON for preferably 30 minutes, the microprocessor will shut down the compressor regardless if the room temperature has been reached or not, but keep the fan running for the next cycle.

Again, by monitoring the compressor ON time and compressor OFF time, the HVAC CHIP also obtains an indication of the difference between the room temperature and the outside air temperature and the rate at which the room is heating up after the compressor is OFF.

For example, if the outside temperature is 100 degrees Fahrenheit (degrees F.) and the room set temperature is 75 degrees F. (assume a hysteresis of +/−1 degrees F.), the compressor could be running for 20 minutes before the room reached the 74 degrees F. (75 degrees F.−1 degree F hysteresis) and then the compressor goes to OFF maybe for 5 minutes. After the compressor is OFF, then the room will get heated up relatively fast due to 100 degrees F. outside. So, when the room temperature gets to 76 degrees F. (75 degrees F.+1 degree F. hysteresis), the compressor is ON again and let's assume for 10 minutes before it reaches the set temperature again. The fan time extension algorithm may be to take 10% of previous ON period, which is 2 minutes ("mins"), plus 20% of the previous OFF period, which is 1 min, plus 20% of the current ON period which is 2 mins totaling 5 mins, which would mean to extend the fan run for 5 mins at the end of the current compressor ON time. However, if the outside temperature is only 85 degrees F., then, it takes longer for the room to be heated up to 76 degrees F. In this case, the compressor OFF time is maybe 7 minutes; and let's assume the compressor is ON again for 10 mins after that. So, the algorithm for fan extension at the end of this current 10 min compressor ON time may be 2 min plus 1.4 min plus 2 min which total 5.4 minutes. So, by measuring the compressor ON time, and compressor OFF time, the HVAC CHIP can estimate the temperature difference between outside air and room air, and the rate at which the room gets heated up after the compressor is OFF from other temperature changing activities in the room, thus, how long the fan extension run time should be. Thus, shorter fun extension run times will apply when the difference between the room temperature and the outside air temperature is greater, and vice versa.

If the HVAC's cooling elements have been operating continuously for a period of time (e.g., 20-30 minutes), they will be made to shut down by the HVAC CHIP for a short period of time with the fan still running (e.g., 3-5 minutes) to harness the residual stored energy left in the water condensed on the cooling coil.

Hence, the HVAC CHIP recovers and delivers more heating and cooling energy to the conditioned space than is possible with original controls from the thermostat. The HVAC CHIP improves the efficiency of HVAC equipment by delivering additional heating or cooling capacity for a small amount of additional electric energy (kWh) utilized by the fan.

Air conditioners cool conditioned spaces by removing sensible and latent heat from the return air which reduces the supply air temperature and humidity. Latent heat is removed as water vapor is condensed out of the air due to the temperature of the evaporator coil being less than the return air dew point temperature. Latent heat is the quantity of heat absorbed or released by air undergoing a change of state, such as water vapor condensing out of the air as water onto a cold evaporator coil or cold water evaporating to water vapor which will cool the air.

Most evaporators are cold and wet (below 40 to 50 degrees F.) after the compressor turns off. Residual energy left on the evaporator coil after the compressor turns off is generally wasted. The evaporator absorbs heat from its surroundings when the water on the coil evaporates away.

Again, the HVAC CHIP as disclosed herein, recovers the remaining residual energy from evaporator coil by operating the fan after the compressor turns off to cool the conditioned space. In addition, after the compressor has been running for a period of for example approximately 20-30 minutes, the evaporative coil is cold and wet, and by shutting down the compressor while keeping the fan running for, for example, 3-5 minutes, the water evaporating away at the evaporator coil cools down the incoming air flow from the ducting.

Again, most furnace heat exchangers are still hot (above 135 to 210 degrees F.) after the furnace fan turns off. The HVAC CHIP recovers the remaining residual energy from the hot furnace heat exchanger after the furnace turns off and delivers this heat to the conditioned space. In addition, after the heating element has been running for a period of for example approximately 20-30 minutes, the hot heat exchanger is at its maximum temperature, and by shutting down the heating element while keeping the fan running for, for example 3-5 minutes, the residual energy still heats up the incoming air flow from the ducting.

Figure 2A:
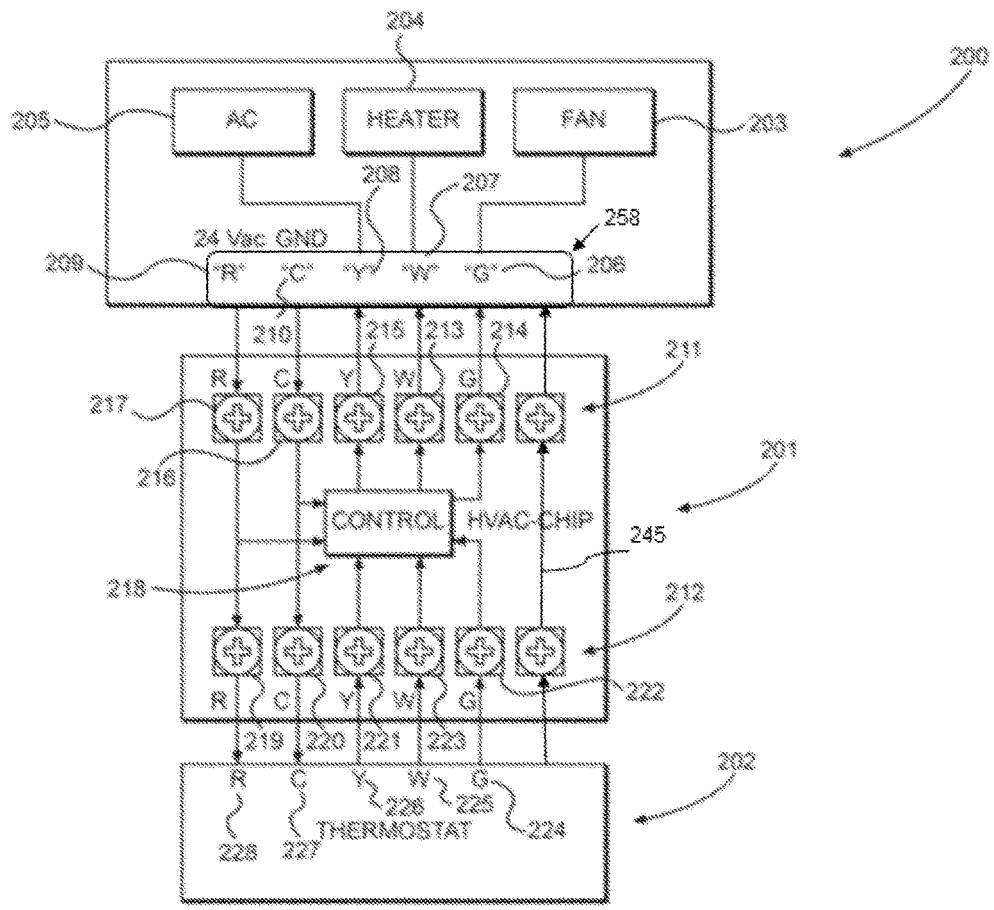
FIG. 2a illustrates a modified block diagram of FIG. 2, according to an aspect.

Again, as described earlier when referring to FIG. 2, the HVAC CHIP works by preferably disconnecting from the original thermostat all the original wires that come from the air handler unit, and re-connecting all these wires to the HVAC CHIP module. A set of duplicate wires from the HVAC CHIP is then directly connected to the thermostat (see FIG. 2). As shown in FIG. 2, the HVAC CHIP 201 may have five wires (green, white, yellow, common and red) to be connected to the thermostat. The original wires from the thermostat to the Air Handler Unit are disconnected from the thermostat. These corresponding five wires that come from the air handler unit control board are then connected to terminals 213-217 of the HVAC CHIP 201 as shown in FIG. 2. In another exemplary embodiment, the HVAC CHIP 201 may have six wires as shown in FIG. 2a. The sixth wire may be, as shown, a pass-through wire 245 and may be used for example to connect the thermostat's reversing valve O/B output to the air handler control board 258.

It should be noted that providing the same number of wires that have identical color coding as the original wires that come from the air handler control board 258 (FIG. 2a) comes with the advantage of eliminating or minimizing mistakes during installation by the field technicians.

When the thermostat sends out signals to the fan, compressor and heater, they now all go to the HVAC CHIP. If not a pass-through wire, the HVAC CHIP reads the signals from these wires coming from the thermostat and automatically sends out the desired signals described herein to the air handler unit control 258 of FIG. 2a that controls the HVAC.

Again, the HVAC CHIP may use the outputs of the thermostat as its inputs. The command signal from the thermostat may be either a high of 24 vac or 0 vac (ground) or sometimes in floating state. Correspondingly, the HVAC is configured to accept either 24 vac or 0 Vac or float state as its inputs so that it can interface with every manufacturer's thermostats used in HVAC systems.

In another embodiment, a remote temperature sensor (not shown) can be installed in association with the HVAC CHIP to sense the temperature of the outside air. The HVAC CHIP can be installed inside the house next to the thermostat, or at the air handler in the garage or attic or outside the building on the roof for roof top units (RTU). If the HVAC CHIP is installed inside the house, a remote temperature probe can be installed outside the house and sending the information to the HVAC CHIP by RF signal. The purpose of this temperature sensor will be described hereinafter.

Figure 3:
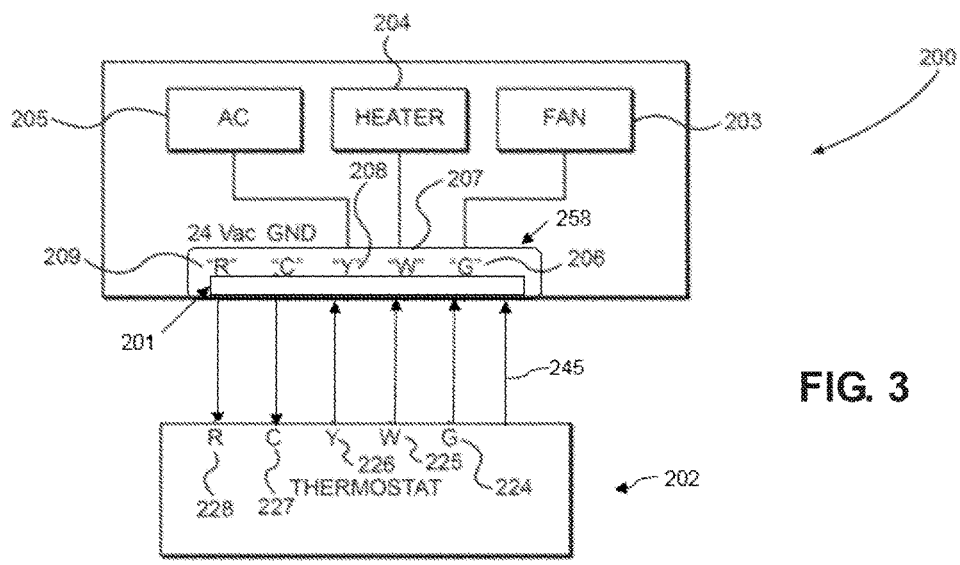
FIG. 3 is a block diagram illustrating that the integrated circuit from FIG. 1 can be part of the air handler control board, according to an aspect.
Figure 4:
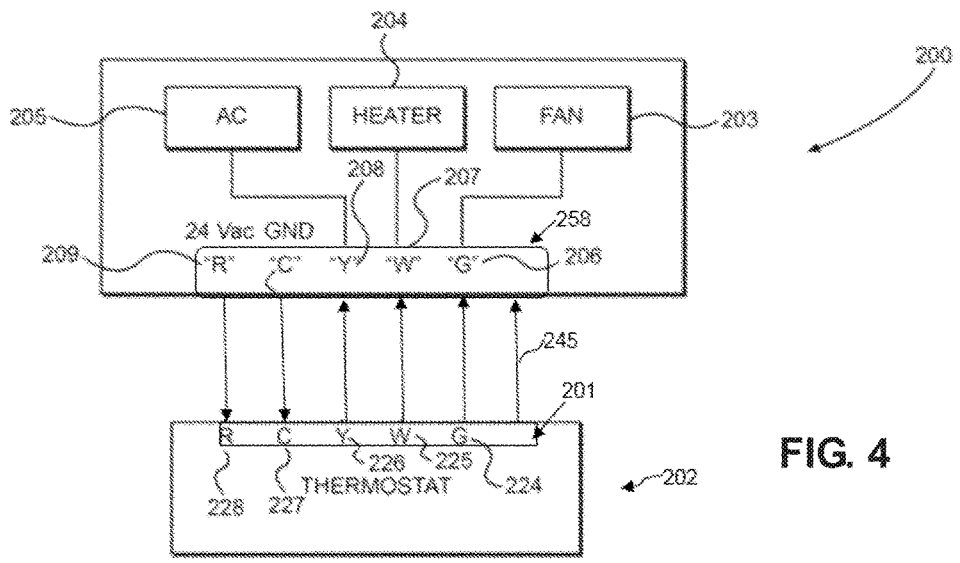
FIG. 4 is a block diagram illustrating that the integrated circuit from FIG. 1 can be part of the thermostat, according to an aspect.

Alternative ways of installation or integration of the HVAC CHIP 201 may be provided as in the examples shown in FIGS. 3-4. Again, FIG. 3 is a block diagram illustrating that the HVAC CHIP 201 can be part of the air handler control board 258 as an add-on circuitry or being integrated into the control board 258 circuitry or logic. FIG. 4 is a block diagram illustrating that in another alternative, the HVAC CHIP 201 can be part of the thermostat as an add-on circuitry inside the thermostat or being integrated into the circuitry or logic of the thermostat. In other words, a thermostat 202 (FIG. 4) may be provided having the functionality and the benefits of the HVAC CHIP as described in this disclosure.

In yet another embodiment, the reversing valve signal from the thermostat may be read by the HVAC CHIP. The reversing valve is identified as O/B terminal on the thermostat. In FIG. 2, the input terminals 212 will have an additional terminal (shown in FIG. 2 as unconnected terminal) to connect to the thermostat's reversing valve O/B output (not shown in FIG. 2). The HVAC CHIP can read this output to do the following functionality. For heat pump HVAC system, the compressor is used in reverse to provide heat to the rooms. In this case, the ESC HVAC CHIP read the reversing valve output (O/B) from the thermostat, and will preferably either disable the extend fan run time, or extend the fan run time to for example 25% of its programmed duration after the heat pump (compressor) has completed its cycle. For example, if the outside temperature is below 40 degrees Celsius (C), the additional fan run time or the compressor shut down with fan running may bring in very cold air. Therefore, it would be desirable to install a temperature sensor in association with the ESC to bypass the energy saving features described earlier in this disclosure if the outside temperature is sensed to be below a predetermined level (e.g., 40 degrees C.).

Also, preferably, for the heat pump mode, the HVAC CHIP will not shut down the heat pump (compressor) for a few minutes after a continuous run of for example 20-30 minutes, to ensure no cold air is blowing into the room.

In another embodiment, a humidity sensor can be installed in association with the HVAC CHIP to sense the humidity of the outside air if the HVAC CHIP is installed at the roof top, or the inside room air if the HVAC CHIP is installed inside the building. During the summer, in some months and some parts of the country, the humidity could be for example over 75 percent. Since the energy saving feature of the HVAC CHIP is based on the recovery of latent energy from evaporating away the water condensed onto the cooling coil, when the humidity is very high, the condensed water cannot be evaporated away. In addition, blowing high humidity air into the room with the compressor off is uncomfortable for many people. Therefore, it would be desirable to install a humidity sensor in the HVAC CHIP to bypass the energy saving features if the outside humidity is for example over 75% or the inside humidity is over for example 65%. This bypass feature can be factory programmed or user programmed depending on the user's choice.

Figure 5A:
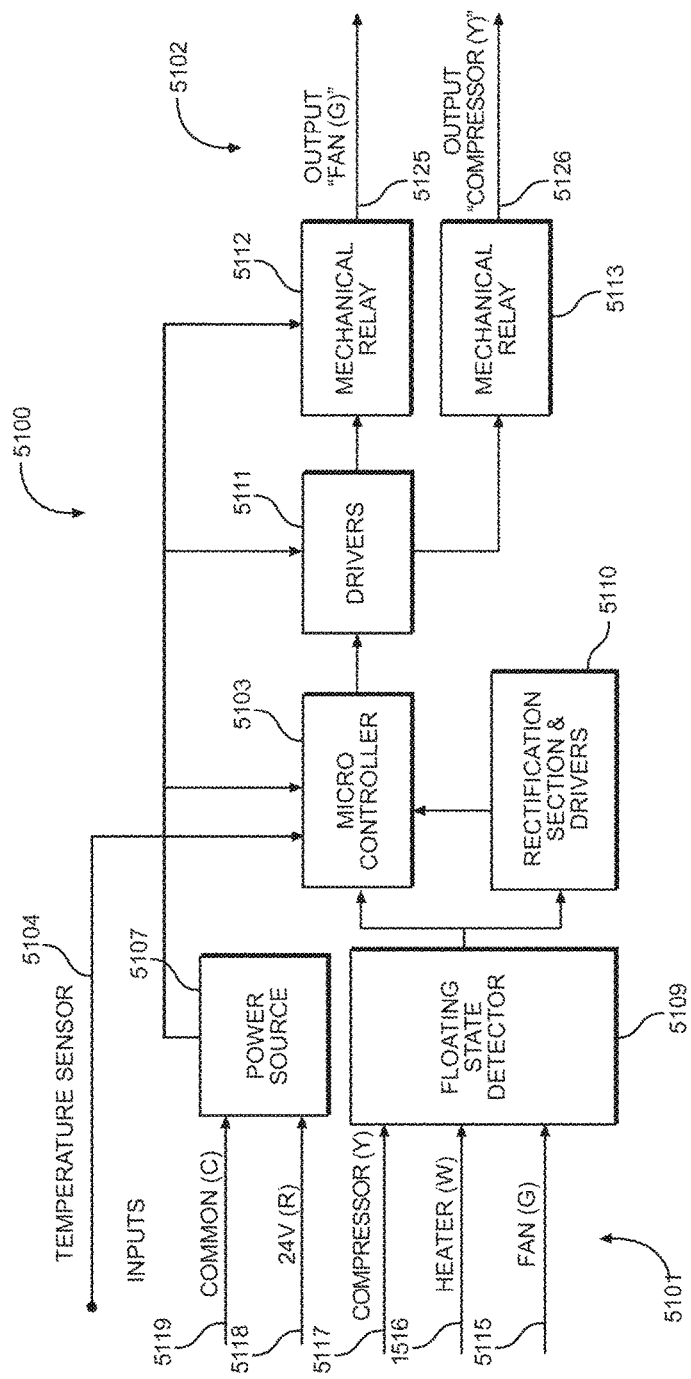
FIG. 5A illustrates a block diagram of an example of an HVAC CHIP for controlling the fan and the compressor for a heating, ventilation and air conditioning system, according to an aspect.

FIG. 5A illustrates a block diagram of an example of an HVAC CHIP 5100 for controlling the fan and the compressor for a heating, ventilation and air conditioning (HVAC) system, according to an aspect. The HVAC CHIP 5100 may include an input port having a plurality of input terminals 5101 and a plurality of output terminals 5102, an embedded temperature sensor 5104, a power source 5107, a microcontroller (MCU) 5103, a floating state detector 5109, a rectification section and drivers 5110, additional drivers 5111, mechanical relays ("mechanical relays" or "relays") 5112 and 5113. The rectification section may be diodes and transistors to provide rectification of the input signals, and may help to make them more suitable to be processed by the microcontrollers. The drivers 5111 may be transistors circuits to provide sufficient voltage and current to turn on the mechanical relays. The mechanical relays may use a solenoid coil or control coil to make or break the electrical contacts.

The HVAC CHIP 5100 may, for example, include at least one of the plurality of input terminals 5101 passing through the floating state detector 5109 and rectification 5110 and, together with the temperature sensor 5104, may control the MCU 5103 to activate drivers 5111 to turn on at least one of the plurality of mechanical relays 5112, 5113 to provide an output 5102 of the circuit 5100, which may then enable the switching OFF or ON of at least one of the output terminals 5125, 5126 to the 24 vac or 0 vac power lines. The floating state detector 5109 may be able to provide information to the microcontroller regarding a floating state signal coming from the thermostat, and therefore the microcontroller may be able to process the floating state signal as described earlier in paragraph 0083, for example.

The plurality of input terminals 5101 may connect the HVAC CHIP 5100 to the thermostat of a HVAC system. The plurality of input terminals 5101 may include a first input terminal 5115, a second input terminal 116, a third input terminal 5117, a fourth input terminal 5118, and a fifth input terminal 5119 and an embedded stand-alone terminal 5104. As shown as examples, these input terminals may be for a fan ("G"), heater ("W"), compressor ("Y"), 24 vac ("R"), or a common input terminal ("C"), and an example of the embedded terminal may be a temperature sensor. The input terminal 5119 may be from one of the outputs, the first terminal of the 24 vac transformer (not shown), and is in this example referred to as a common terminal with a voltage of 0 vac with reference to the ground node of circuit 5100.

The input terminal 5118 may receive its input from the second terminal of the 24 vac transformer (not shown), which shall be designated as the "R" input and which is connected to the thermostat's red color-coded wire. In circuit 5100, the terminal 5118 may be at 24 vac with reference to the ground node. The input terminal 5115 may receive input from the thermostat's fan output line which may typically be either a 24 vac or a 0 vac level. This line may also at times be in a floating state. The input terminal 1516 may receive input from the thermostat's heat output line which may be either a 24 vac or a 0 vac level. This line may also at times be in high impedance state. The input terminal 5117 gets its input from the thermostat's cool output line which is either a 24 vac or a 0 vac level. This line may also at times be in a high impedance state.

The power source 5107 may act as a constant voltage source to provide a constant voltage to the MCU 5103 and the drivers 5110, 5111 and mechanical relays 5112, 5113. The power source 5107 may be a switch mode power or its derivative, with filters and capacitors to maintain a regulated output supply voltage. The power source 5107 may be provided as part of the HVAC CHIP.

The MCU 5103 may have a plurality of terminals which may accept inputs from the temperature sensor 5104, and conditioned signals from 5109 and 5110 and outputs to provide triggering signals to the drivers 5111. The drivers 5111 may provide drive power to the solenoids of the mechanical relays 5112, 5113 to turn on or off the output terminals 5125 and 5126.

As another example, the mechanical relays 5112, 5113 may be replaced with any other suitable electromechanical switchers, such as contactors or multiplexers.

The plurality of output terminals 5102 may connect the HVAC CHIP 5100 to the air handler unit of a HVAC system. The plurality of output terminals 5102 may include a first output terminal 5125, a second output terminal 5126. The first output terminal 5125 may go to the air handler unit's fan input. The second output terminal 5126 may go to the air handler unit's compressor input.

Energizing or de-energizing the coils of relays 5112, 5113 may enable output terminals 5125, 5126 to be connected to 0 vac or 24 vac. These in turn may control the operations of the air handler unit's solenoids to activate or deactivate the high voltage contactors or relays of the blower fan, compressor and gas/electric heater.

The MCU 5103 may be programmed for energy efficient operation of the HVAC system by extending the fan run time of the HVAC blower fan based on the residual energy left over in the heater elements or in the air conditioning cooling evaporator coil and/or the rate of energy transfer in the conditioned room (i.e., how fast the room heats up again in the case of a cooling cycle, or how fast the room cools down again in the case of a heating cycle), as it will be described in more details hereinafter. The rate of energy transfer may be obtained by monitoring the behavior of the on-off periods of many prior cycles to estimate temperature differences between inside the conditioned space and outside the conditioned space, and thus the rate at which the room is heated up or cooled down by its environment during the OFF period after the thermostat sends command signals to have the HVAC shut off. Additionally, if the compressor (or heater, if the HVAC system is in heating mode) has been running continuously for a predetermined period or a variable period of time based on some algorithms derived from the input of sensors placed at the evaporative coil or at the primary and/or secondary heat exchanger surfaces, the MCU 5103 may shut down the HVAC compressor (or heater) for either a fixed period (for example, 3 to 5 minutes) or a variable period (for example, after the sensors reported the evaporative coil has no moisture left or the heater heat exchanger has cooled down), while the fan continues to run, even though the thermostat did not send a command signal to have the compressor (or heater) shut down. The aforementioned two actions, extending fan run time and shutting the compressor or heater briefly, may be independent of each other and may be controlled by the MCU 5103. Shutting down the compressor or heater if they run continuously for 30 minutes, for example, but keeping the fan running, may act like a fan extension and this may save energy.

The input terminal 5115 voltage may change depending on the ON/OFF position of the thermostat's fan output. The first input terminal 5115 may come from the thermostat fan output command signal (which may be a color coded green wire) and may have a voltage selected from a group consisting of 24 vac, 0 vac and a floating value. As an example, the floating value means that the input terminal 5115 is not connected to either 24 vac or 0 vac, and can assume any value, while the input terminal 5119 always has a common terminal voltage of 0 vac with reference to the circuit's 5100 ground, and while the input terminal 5118 is at 24 vac and is typically connected to the thermostat's red wire power line.

The temperature sensor 5104 may be embedded into the HVAC CHIP such that the temperature sensor itself is exposed to the immediate environment where the HVAC CHIP is installed. The input from the temperature sensor 5104 may supply the analog value or digital value of the air temperature on a continuous basis at the vicinity where the HVAC CHIP 5100 is installed to the MCU 5103. The MCU 5103 may then convert these temperature sensor data and use the data to calculate the exposed air temperature in the immediate vicinity of the HVAC CHIP installed location. When there is a call for cooling, the MCU 5103 may start recording the inputs of the temperature sensor 5104 and may calculate the temperature change gradient continuously. The MCU 5103 may determine the outside air temperature where the HVAC CHIP is installed, at the start of a cycle and continuously receive air temperature data until the end of the heat or cool cycle.

As an example, if the gradient of change is flat or very small, following a pattern that falls within the usual temperature variation of outside air, and there is little change between the start and end of the call for cool or heat, then the MCU can determine that the HVAC CHIP 5100 is installed outside the conditioned room. That is, if the temperature sensor is continuously reporting approximately the same temperature value (within normal+/−tolerance) to the microcontroller (MCU) 5103 while the heating or cooling cycle is on, then the HVAC CHIP knows that it is installed outside of the conditioned space. For example, if the HVAC CHIP 5100 detects a 95 deg F. from it embedded temperature sensor at the start of the cooling cycle, and at the end of the cooling cycle the reading is 94 deg F. Since this temperature delta is within the 1 deg F., the HVAC CHIP know it is installed in the garage or in the attic etc and not inside the conditioned room. This is because the temperature outside of the conditioned space will not be affected by the HVAC's heating or cooling runs. However, if the temperature gradient is larger and behaves as in the conditioned room where the air conditioning or heater is running, then the MCU can determine that the HVAC CHIP 5100 is installed inside the conditioned space. For example, if the HVAC CHIP 5100 detects 85 deg F. from it embedded temperature sensor at the start of the cooling cycle, and and at the end of the cooling cycle the reading is 80 deg F. Since this temperature delta is greater than 1 deg F., the HVAC CHIP know it is installed in inside the conditioned room. That is, if this sensor is reporting decreasing temperature values while the cooling compressor is running, or increasing temperature values when the heater is running, then the HVAC CHIP knows it is installed inside the conditioned space. Thus, by processing the temperature data collected by this sensor, the HVAC CHIP can autonomously determine the location of its installation.

By knowing this information, the HVAC CHIP can then determine when to bypass the energy saving features of fan extension or compressor/heater rest when the outside air temperature is at its extremes for a short period of time, such as during a heat wave or during a winter cold front. If the HVAC is installed outside of the conditioned space, once the extreme air temperature is reached, for example, if the sensor is reporting above 120 degrees F, then the MCU can shut off the fan extension and compressor/heater rests to ensure that the user need not be subjected to uncomfortable temperature conditions. However, if the HVAC CHIP determines that it is installed inside the conditioned space, the MCU can behave like a regular thermostat by sensing how the rate at which the conditioned space is being cooled down and heated up over time. As an example, if during the 30 minutes of continuous compressor run the embedded temperature sensor reports that the room temperature has not dropped, for example, more than 2 degrees F, then it will not call for the few minutes of rest time for the compressor, as it would during the regular energy saving operation. In another example, if the embedded temperature sensor reports that the rate of temperature change inside the conditioned room is very slow while the compressor/heater is running, it may decide to bypass the fan extension entirely or make the fan extension run time very short upon completion of the run cycle. This is because the HVAC CHIP will know the outside air temperature must be very cold or very hot or the humidity is very high, and the conditioned room may become uncomfortable for its occupants if the fan extension run time is too long. Thus, in this example, the new plug and play HVAC CHIP energy saving controller provides the ability to autonomously, without any external intervention, bypass the fan extension run time and compressor/heater rest when the outside air temperatures are at its extremes, thus providing more comfort to the occupants of the conditioned space while enjoying energy savings during non-extreme weather conditions.

In the same manner, other sensors such as humidity sensors, light sensors, pressure sensors, air flow sensors, motion sensors, sound sensors, wave sensors, etc., all can be embedded into the HVAC CHIP, or each can be used as a standalone sensor, or a plurality of sensors can be used in combination with each other, to report other conditions that may be required to improve the functionality of the HVAC CHIP and to improve the comfort level of the occupants.

As another example, if the thermostat calls for heat and the thermostat's fan line stays inactive, then the MCU 5103 will know that the gas heating cycle has started. In all thermostat designs in the U.S., when the thermostat is selected to "Gas" during initial installation, the heater is based on gas furnace as the heating element, the thermostat will not activate the fan when the thermostat calls for heat.

Then, the MCU 5103 of FIG 5A will wait for a period of time, and then energize the relay 5112 for the fan output 5125 to be active for a period of time, and then de-activate the relay 5112 to turn off the fan output and repeats until the gas furnace heating cycle is completed. In this way, the MCU 5103 continuously modulates the relay 5112 to cycle on and off in the same heating period until it is time for the fan run time to be extended, at which time the relay 5112 will stay activated until the extended fan run time expires. The duration of the relay 5112's ON and OFF modulation may be fixed or variable based on software algorithms, which may be based on at least one or more input from sensors 5104, inputs 5115, 1516, 5117, and outputs 5112 and 5113.

Figure 5B:
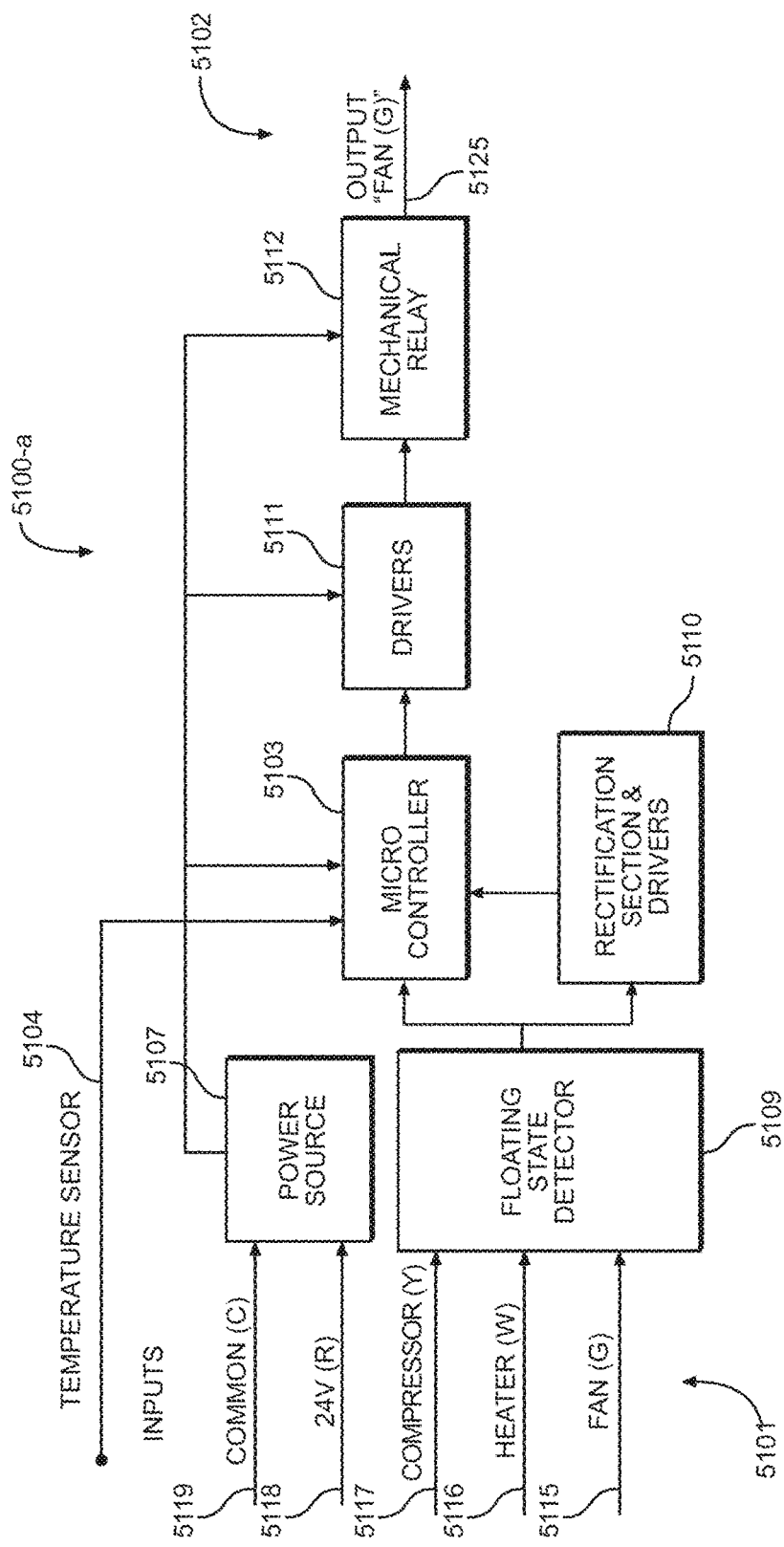
FIG. 5B illustrates a block diagram of another example of the HVAC CHIP for controlling the fan only, according to an aspect.

FIG. 5B illustrates a block diagram of another example of the HVAC CHIP 5100-a, according to an aspect. As shown as an example, the HVAC CHIP 5100 may operate in a similar manner as the example shown in FIG. 5A, except having only one output for controlling the fan only. The single output may be the fan output 5125. An advantage may be that with only half of the components of the example shown in FIG. 5A being used, costs may be lowered for the user and for application where the end user does not want their compressor to have pause or rest during the call for cooling.

Figure 6A:
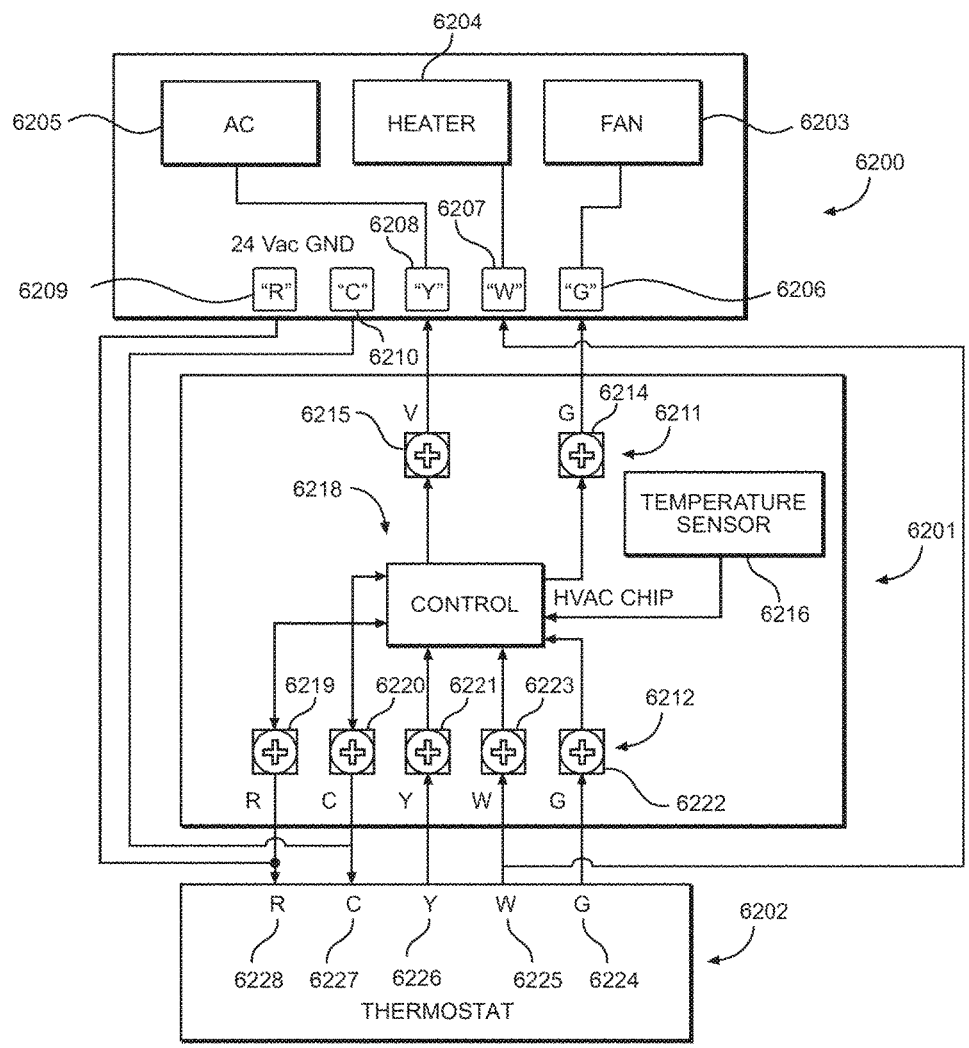
FIG. 6A illustrates a connection diagram of an example of a HVAC air handler unit with a HVAC CHIP, having a fan and a compressor output with an embedded temperature sensor, according to an aspect.

FIG. 6A illustrates a connection diagram of an example of a HVAC air handler unit 6200 with a HVAC CHIP 6201, having a fan 6203 and a compressor output with an embedded temperature sensor, according to an aspect. As shown as an example, the HVAC CHIP 6201 may include a controller 6218 for controlling a fan 6203, a heater 6204 and the AC 6205 of a HVAC Air Handler Unit 6200. As shown as an example, the HVAC CHIP 6201 may be connected to the thermostat 6202 and the air handler unit 6200, and may be installed at any point along the wiring path between the thermostat and the air handler, for controlling the fan 6203, heater 6204 and AC 6205 of a HVAC Air Handler Unit (AHU) 6200. The HVAC CHIP 6201 configuration, and more specifically that of its microcontroller (MCU) 6218, may be, as an example, that of the HVAC CHIP 6100 shown in FIG. 5A. The AHU 6200 may be the main part of an HVAC system that includes high voltage contactors for air conditioner (AC) 6205, a heater 6204 and a fan 6203. The high voltage contactors may be controlled by the 24 vac solenoids that are connected to outputs of the thermostat or/and the HVAC CHIP. As an example, color coded green wire is connected to terminal 6206, color coded white wire to terminal 6207, color coded yellow wire to terminal 6208, and color coded red wire to terminal 6209 and the common wire and its terminal 6210.

The HVAC CHIP 6201 is, as shown as an example, connected between the thermostat 6202 and the HVAC air handler unit 6200. The HVAC CHIP 6201 includes output connectors 6211, input connectors 6212 and the MCU 6218. The output connectors 6211 have wire lead terminals or screws terminals 6214 and 6215 to connect to the HVAC 6200. The input connectors 6212 may have wire lead terminals or screw terminals 6222, 6223, 6221, 6220 and 6219 to connect to the thermostat. In addition, the HVAC CHIP 6200 may have its embedded temperature probe 6216 as input to detect the air temperature at its installed location.

As an example, from the output connector 6211, the wire from the G terminal 6214 is connected to the G terminal 6206 of HVAC 6200, and the wire from Y terminal 6215 is connected to the Y terminal 6208 of HVAC 6200.

As an example, and as shown in FIG. 6A, from the input connector 6212, the wire from the G terminal 6222 is connected to the G terminal 6224 of thermostat 6202. Wire from W terminal 6223 is connected to the W terminal 6225 of thermostat 6202. Wire from Y terminal 6221 is connected to the Y terminal 6226 of thermostat 6202. Wire from C terminal 6220 is connected to the Common terminal 6227 of thermostat 6202 and also to 6210 of the air handler unit 6200. Finally, the wire from R terminal 6219 is connected to the R (Red) terminal 6228 of thermostat 6202 and also to 6209 of the air handler unit 6200.

When the thermostat 6202 sends any control command instructions through its fan, heat or cool outputs, these instructions may go into HVAC CHIP 6201, which may act as an energy saving controller (ESC or HVAC CHIP) by manipulating these instructions and sending a revised set of energy savings command instructions to the HVAC 6200, as disclosed herein. Further, the HVAC CHIP 6201 may continuously monitor the status of the thermostat 6202, and may turn off the fan or compressor if it detects a float or high impedance state of thermostat 6202, due to a variety of reasons.

The HVAC CHIP 6201 configuration, and more specifically that of its microcontroller (MCU) 6218, may be as that of the HVAC CHIP 100 from FIG. 1. As shown in FIG 2, the AHU 200 is the main part of an HVAC system that includes high voltage contactors for air conditioner (AC) 205, a heater 204 and a fan 203. The high voltage contactors are controlled by the 24 Vac solenoids that are connected to the outputs of the thermostat or/and the HVAC CHIP. Color coded green wire is connected to terminal 206, color coded white wire to terminal 207, color coded yellow wire to terminal 208, color coded red wire to terminal 209, and the common wire and its terminal 210.

Figure 6B:
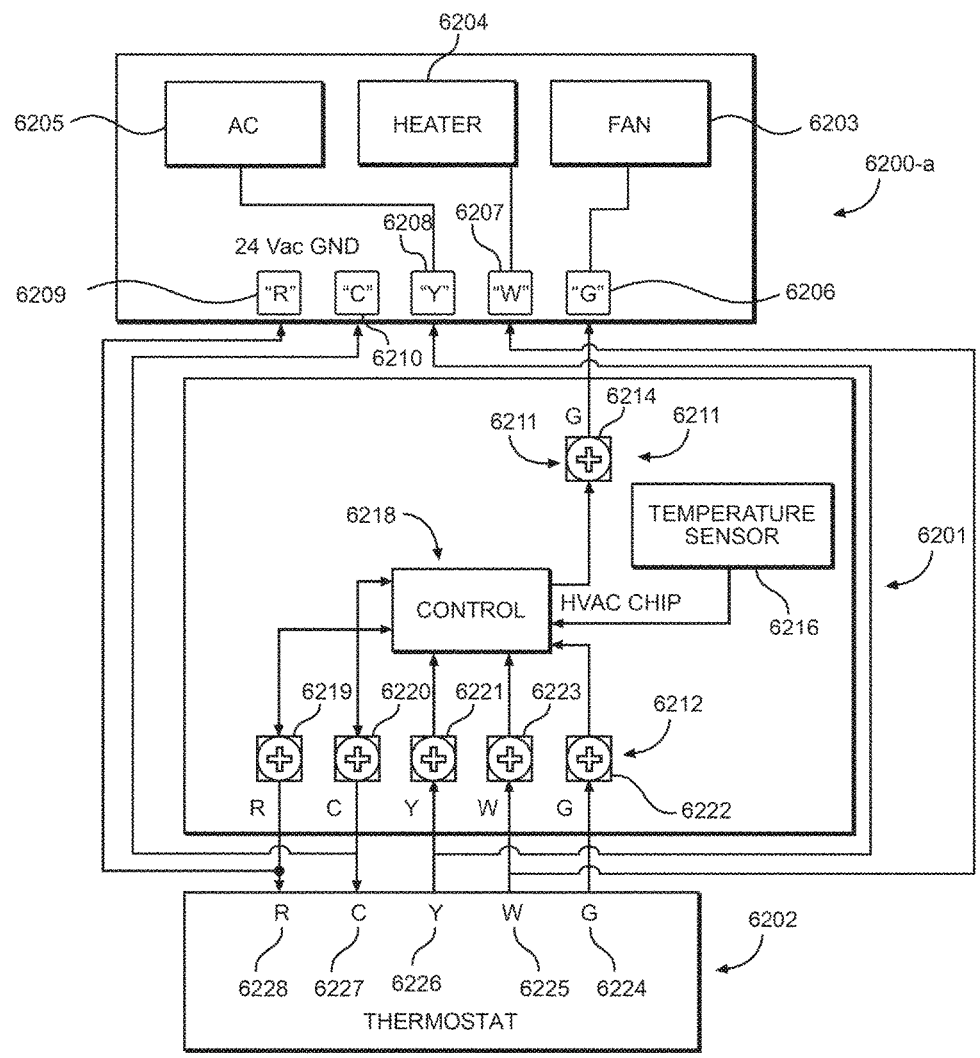
FIG. 6B illustrates a connection diagram of another example of the HVAC air handler unit, with a HVAC CHIP having only a fan output with an embedded temperature sensor, according to an aspect.

FIG. 6B illustrates a connection diagram of another example of the HVAC air handler unit 6200-a, with a HVAC CHIP 6201-a having only a fan output with an embedded temperature sensor, according to an aspect. As an example, the HVAC CHIP 6201-a as shown in FIG. 6B may be used for applications where there is no need to have compressor rest features, such as, for example, for users living in high heat climates or hot climate zones where a compressor rest feature could be omitted. Thus, an advantage may be that the unit cost of the HVAC CHIP 6201-a may be lower than the HVAC CHIP 6201 shown in FIG. 6A, similar to the unit described when referring to FIG. 5B. The temperature sensor 6216 as shown in FIG. 6B may perform similarly to that of the HVAC CHIP 6201 of FIG. 6A, for example.

Figure 7B:
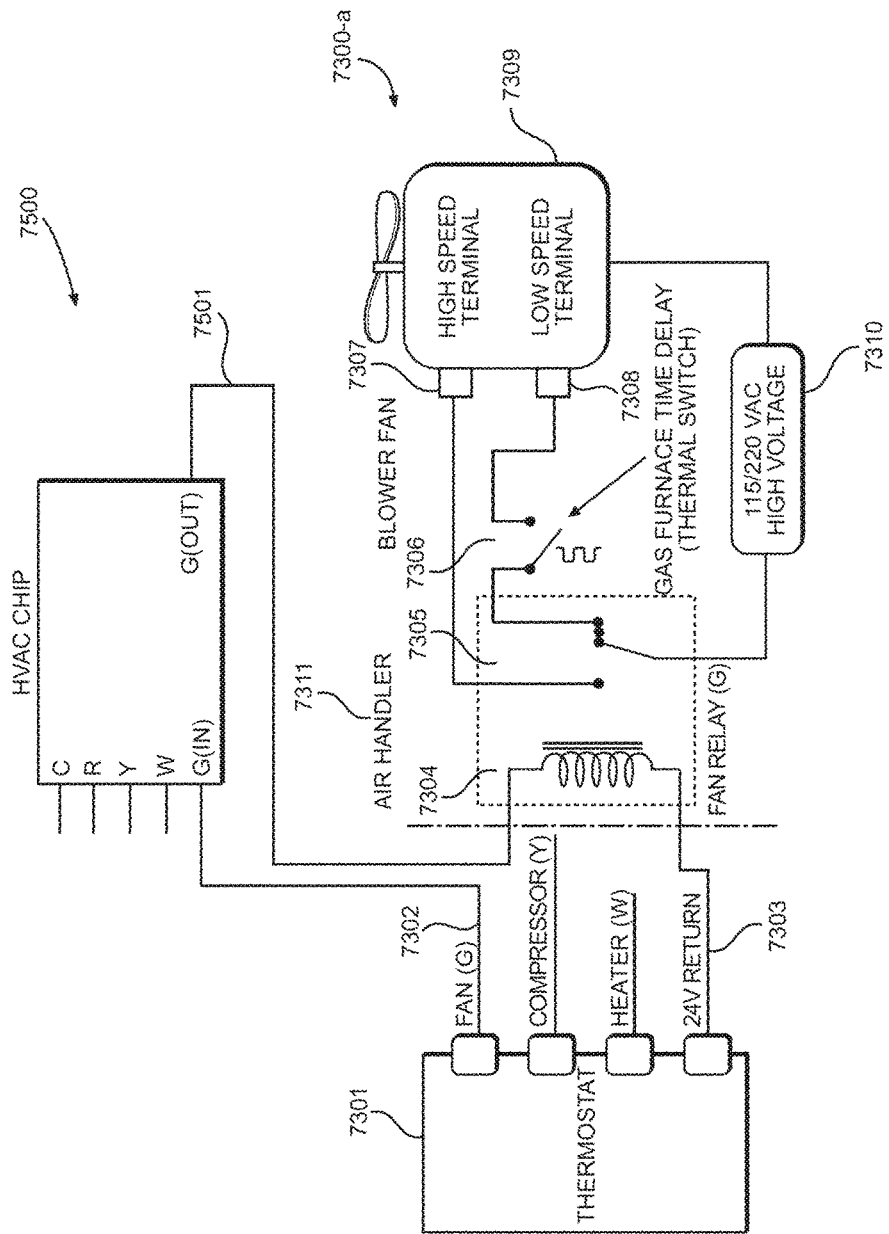

FIGS. 7A-7B illustrate an example of a typical connection 7300 of a HVAC system, and a typical connection 7300-a of a HVAC system with the HVAC CHIP interfaced into the system, respectively, according to an aspect. As shown in FIGS. 7A-7B, the HVAC system may use a gas furnace heating element, and a blower fan 7309 with two fixed speeds, for example. This connection/structure may be simulated into the HVAC CHIP system. The prior art example as shown in FIG. 7A illustrates how a typical gas furnace HVAC system may be connected, and a similar system may be interfaced with the HVAC CHIP, as will be discussed further when referring to FIG. 7B. As another example, some gas furnace heating elements may use only a single speed blower fan, and some may have two speeds and two sets of terminals (a high fan speed input terminal, and a low fan speed input terminal) such as the blower fan 7309 of FIG. 7A.

As a practice in the U.S., when the thermostat is selected to "GAS" mode during installation of the thermostat to indicate that the gas furnace is the heater in a HVAC system, the thermostat fan 7302 will always stay de-activated when the thermostat calls for heat. The blower fan in this case is activated by the gas furnace thermal or time delay switch 7306.

As an example, if the line voltage is applied to the high speed terminal 7307 of FIG 7A, the blower fan may run at a high speed, and if the line voltage is applied to the low speed terminal 7308 of FIG 7A, the fan may run at a low speed. A two-pole contactor 7305 of FIG 7A, energized by the 24 vac low voltage control coil 7304 of FIG. 7A, may determine whether the line voltage gets connected to the high speed terminal 7307 or low speed terminal 7308. If the 24 vac control coil 7304 is not energized, the low speed terminal 7308 may be the default setting. Thus, by sending pulsing 24 vac voltage to the control coils 7304, a modulation of the blower fan speeds, between low and high, may be achieved.

As shown by the schematic in FIG. 7A (prior art) as an example, a thermostat connection to a typical gas furnace heating system 7300 in a HVAC may have blower fan motors 7309, and may include a fixed low-speed connection 7308 and a fixed high-speed connection 7307 to the same blower fan motor 7309. The schematic also shows how the gas furnace time delay switch 7306 may turn on the low speed blower fan 7309 when there is a call for heat.

The thermostat 7301 may include a fan output 7302 that connects to the air handler unit's 24 vac control coil (which may also be a "solenoid coil") 7304 and returns to the thermostats return wire 7303.

As shown in FIG. 7B as an example, the HVAC CHIP 7500 may be integrated into the system by being connected between the thermostat 7301 and the Air Handler 7311. The thermostat fan output 7302 is now connected to the HVAC CHIP fan input "G (IN)". The HVAC CHIP fan output "G (OUT)" then connects to the input of the Air Handler 7311's solenoid or control coil 7304. As an example, when in the gas furnace heat cycle, a plug and play HVAC CHIP controller may be configured to modulate its fan output "G (OUT)" 24 vac fan line such that the gas furnace blower motor 7309 speed can be configured to modulate between low speed and high speed continuously within the same heating cycle. Note that the double pole contactor 7305 of the Air Handler 7311 may default to the low speed position and when the switch 7306 is activated, the blower fan 7309 may run at low speed.

Therefore, when the fan out 7501 of HVAC CHIP 7500 is not activated, the solenoid coil 7304 is not energized, and the blower fan 7309 runs at low speed. However, when the fan out 7501 of HVAC CHIP 7500 is activated, the solenoid coil 7304 is energized, and the blower fan 7309 now runs at high speed.

Thus, by having the HVAC CHIP outputs a high/low pulsating waveform into 7304, the 2 poles contactor will switch back and forth from the first pole to the second pole, which in turns makes the blower motor 7309 alternates between low speed and high speed continuously. This makes the air flow from the blower motor 7309 behaves like a variable speed blower fan. Advantages may be that better comfort may be provided to the user or occupant of the conditioned space, and energy efficiency may be increased.

Energizing the HVAC CHIP fan output to be on/off, and the on-off cycles may be based on algorithms. More than one algorithms may be used during a single heating cycle based on how long the heater has been running and/or data collected from the durations of past ON and OFF cycles of the heater operations and/or inputs from the temperature sensor of, for example 6216 of FIG 6A. Again, when the gas furnace is used in an HVAC system, the thermostat internal setting for is selected to "GAS" by the installer. Once this is selected, the thermostat will not activate its fan output when there is a call for heat. Instead the turning on and turning off of the fan blower motor is controlled by a time delay relay or a thermal switch activated by the gas furnace control board. The gas furnace control board is connected to the power for the low speed fan motor wiring, if the HVAC system is using a dual fixed-speed (two speed motor) fan. The thermostat fan output, on the other hand, energizes the high voltage relay that connects to the power to the high-speed fan motor wiring. Therefore, by energizing and de-energizing the solenoid coils 7304, and due to motor inertia, the blower fan speed can be made to vary from high to low to simulate the behavior of a variable speed fan without the need for replacement of a two-speed fan, which may further improve efficiency.

The following exemplary process may occur during operation and use of the HVAC CHIP integrated with a HVAC system in order to use a two-speed fan motor to simulate the behavior of a variable speed fan motor. Referring to FIG 7B, the integration of the HVAC CHIP into the HVAC system may allow for the manipulation of energizing and de-energizing the solenoid coil 7304. First, when the solenoid coil 7304 is not energized, during the call for gas furnace heat, the high voltage line 7310 may be connected to a time delay or thermal switch 7306. This time delay switch may be adjustable by the user. The furnace board may control the switch 7306, and may activate the switch 7306 to then energize the terminal 7308, which then turns on the low speed blower fan motor 7309.

However, if the fan 7309 is forced to turn on to high speed, the first step is to energize solenoid coil 7304. The contactor 7305, which may be a two-pole contactor, switches its pole, such that the high-speed fan terminal 7307 is energized, turning blower fan motor 7309 into high speed. Therefore, application of voltage to energize the coil 7304 makes the blower fan run in high speed.

Figure 8:
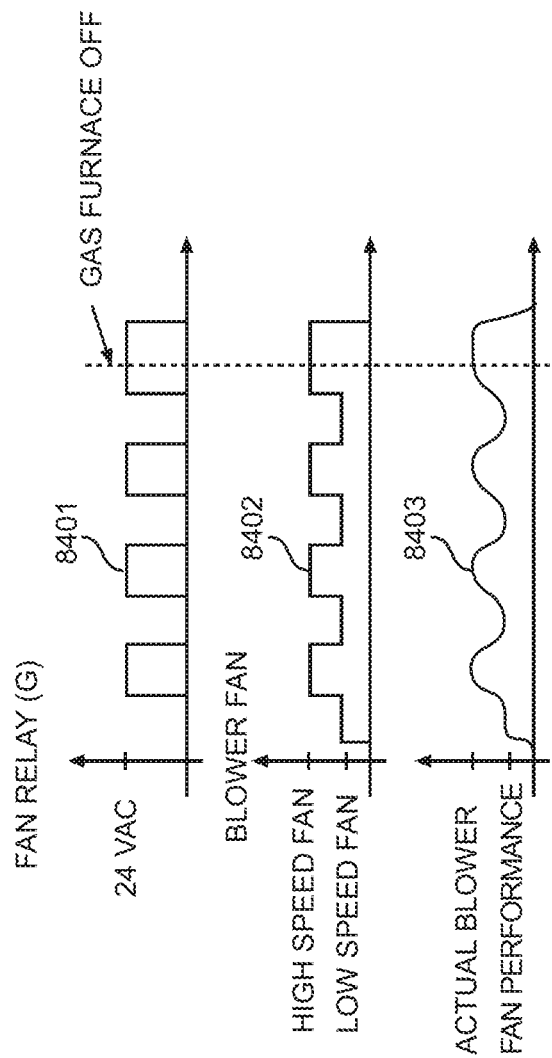
FIG. 8 illustrates charts and graphs of how modulating the HVAC CHIP's 24 vac fan outputs can vary the speed of a 2 fixed-speed motor on a continuous basis over the same cycle, according to an aspect.

FIG. 8 illustrates charts and graphs of how modulating the HVAC CHIP's 24 vac fan outputs can turn a 2 fixed-speed motor into a variable speed motor on a continuous basis over the same heating cycle, according to an aspect. Due to the momentum and inertia of the motor's spinning, when the high speed is energized, the motor may speed up smoothly since it is already spinning and will not draw a substantial current spike. When the motor is energized with low speed the motor spin speed may also slow down gradually due to its inertia. The modulation may be used for a gas furnace heater, for example, during heating mode of a HVAC system.

An example of the HVAC CHIP's fan output (as shown by 7501 in FIG. 7B) being modulated with pulses is shown by graph 8401 (FIG 8). Graph 8402 (FIG 8) shows an example of how the HVAC CHIP pulsating its fan outputs 7501 cause the blower fan switching from low speed to high speed and back to low speed to high speed, etc. for the duration of the same gas heating cycle. Graph 8403 (FIG 8) shows an example of how the actual blower fan speed will vary due to the momentum and inertia of the motor spinning motion. As seen in 8403, the blower fan varying speed has a smooth transition from low to high and from high to low speed. As an example, the software could make the pulse width of 8401 for 2 minutes in high, and 2 minutes seconds in low in a 4-minute period, or could be 30 seconds in high and 120 seconds in low for a 150-second period, and so on. Therefore, the width and frequency of highs and lows pulses can be fixed or variable based on present and past events of the gas furnace operations timing.

These switching may be implemented by including the pulses into the firmware of the MCU (as shown by 6218 in FIG 6A) controlling the mechanical relay (as shown by 5112 in FIG. 5) and the output fan (as shown by 5125 in FIG. 5), which may be connected to the air handler unit (as shown by 7311 in FIG. 7A). Therefore, by using this invention, behavior similar to that of a variable speed blower fan may be achieved without the need to exchange or replace the blower fan motor with a variable speed motor. The occupant of the conditioned room can reap the benefits of additional comfort and energy savings while in gas furnace heating mode.

Again, for gas furnace heating HVAC systems, existing products may be equipped with blower fans that either run on low speed or high speed, which may cause discomfort to the user or perform inefficiently. For example, constant low fan speed may leave residual heat energy at the furnace, which may lead to reduced energy efficiency. Constant high fan speed may cause too much air flow before the air is sufficiently heated, which may blow cold air into the conditioned room and cause discomfort to the user. An advantage of the HVAC CHIP may be that these problems may be solved by mimicking the behavior of a variable speed motor. Modulation of the blower fan speed from low/high continuously, may thus provide good energy savings plus comfort to the occupants of the conditioned room. Another advantage may be that speed modulation may be used for the blower fan without deterioration of the blower fan performance or life span of the motor, due to the inertia or momentum once the fan motor starts to spin.

The modulation of the blower fan motor between low and high speed may be determined by a variety of inputs. The algorithm used for determining on and off times for the low and high speeds may be set for a predetermined time, such as, for example, two minutes on high and two minutes on low, and so on, or the algorithm may change the on and off times based on temperatures detected by the HVAC CHIP's temperature probe, or it may be based on analysis of previously run cycles and off cycles, and so on. As further examples, the HVAC CHIP may adjust the fan operation automatically for heating using the algorithm, which, again, may be derived from analysis of the residual stored energy remaining after furnace has shut down, and the rate at which the condition of the room is changed by its environment after the heater is in the OFF condition. The algorithm may be created by monitoring the on/off and on cycles, and monitoring how long the heater has been running, and how long the heater has been shut off after the set temperature has been reached. Data obtained from many previous cycles may be used for the algorithm, such that predictions can be made for upcoming cycles.

As for the fan extension after the end of the gas furnace cycle, a determination can be made for how long the fan should continue to run based on various factors. These predictions and determinations may be based on a previous cycle or many previous cycles as well as a currently running cycle. Thus, the fan run time extension may continuously be predicted as the system runs, by considering the data from current cycles, the previously run on-off-on cycle, or multiple previously run on-off-on cycles.

The heater element in the heat exchanger may reach its maximum temperature quickly. The MCU may measure the heater ON time to determine whether the heater has reached its maximum temperature. After the heater elements have shut off, the MCU may then estimate how much residual energy is left that can still be used to heat up the room. This information may then be used to determine how much the fan run time should be extended. A sensor may also be placed in the primary or secondary heat exchanger surface to assist the MCU estimate the residual energy left to be harnessed.

In addition, the heater OFF time during the ON-OFF-ON cycle(s) may indicate the rate at which the room cools down after the heater is set to OFF, and this may depend on the temperature difference between the conditioned room and the outside ambient temperature, as well as the environment of the room such as wall insulation, number of living occupants, heat generating appliances (electronic or electrical equipment, lights, computers, TV, etc.), and so on. If the heater OFF time is short, the fan extended run time may also be short, as it may be faster for the residual heat energy left at the heat exchanger to cool down as well. This may also help to prevent cool air from circulating in the room.

As an example, if the room set temperature is 75° F. (75° F.+/−1° F., as an example to account for hysteresis), and the outside temperature is 60° F., the heater may run for 20 minutes to get the room to the target temperature (and may be an actual temperature of 76° F.). Next, the heater may shut off for 10 minutes for the room temperature to drop down to 74° F. Next, the heater may turn on again for 15 minutes. Experiments were conducted to determine that most gas furnaces are able to reach their maximum temperature after 7 minutes of burning. The furnace control board will then usually let the fan continue to run for 90 seconds after it has shut down (which may be referred to as "default fan run time extension"). An exemplary algorithm that may be used is to measure if this 7 minutes run time has been reached, and, if so, to assign a 1 (one) minute fan extension. For the 10 minute duration that the heater is off, another 20% of the shutoff time may be assigned as a time extension (which may be 2 minutes). For the heater ON time of 15 minutes (i.e., over 7 minutes), another 1 minute may be assigned as a time extension. Thus, the total fan time extension may be 4 (four) minutes, as an example. The algorithm can then compare this total time to see if it is above the default extension time of 90 seconds, and if so, then it may extend the fan run time with an additional 4 minutes minus 90 seconds, which may be 2.5 minutes of additional fan run time. In the above example, if the heater was OFF for 6 minutes instead of 10 minutes, then the total fan time extension would be 1 minute+1.2 minutes +1 minute, totaling 3.2 minutes. In this case, the software may extend the fan run time for 3.2 minutes minus 90 seconds, totaling 1.7 minutes of additional fan run time.

In addition, to increase the efficiency of the system even further, if the HVAC's heating elements have been operating continuously for a period of time (e.g., 20-30 minutes), the HVAC CHIP may cause them to shut down for a short period of time (e.g., 3-5 minutes) with the fan still running. This may not only reduce the furnace temperature, therefore help extends its life, but also harvest some residual heat energy for the conditioned room. This continuous run period before the heater is made to rest may be fixed or variable based on inputs from the thermostats and at least one of the host of sensor's inputs into the MCU (as shown by 6218 in FIG. 6A). In addition, the heater rest period may also be fixed or variable based on inputs from the thermostats and at least one of the host of sensors inputs into the MCU 6218.

For air conditioning, the HVAC CHIP may similarly adjust fan operation automatically for cooling using an algorithm. The algorithm may be derived from the residual stored energy left in the water condensed on the evaporator cooling coils and the rate at which the conditioned room gets heated up, which depends on a number of factors (such as the room's insulation, number of occupants in the room, number of appliances operating in the room, temperature difference between the room and the outside ambient, etc.), after the air conditioner has shut down.

A sensor may also be placed in the evaporative coil's surface to assist the MCU 6218 estimate the residue energy left to be harnessed.

The algorithm may be based on how long the compressor has been running, and how long the compressor was shut off (for example, during an on-off-on cycle) in many previously run cycles. Referring now to FIGS. 6A and 6B as an example, when the thermostat calls for cool, the thermostat 6202 output 6226 may be activated. Since the output 6226 is connected to terminal 6221 of the HVAC CHIP 6201 (which may the same as the input shown as 5117 in FIGS. 5A and 5B), this signal may be processed by the floating state detector 5109, the rectification section 5110 and the MCU 5103 which energizes the HVAC CHIP 5100 (which is the same as HVAC CHIP 6201 in FIG 6A) mechanical relay 5113 and the output 5126 then goes into the input 6208 (FIG 6A), and turns on the AC compressor 6205 of the HVAC 6200.

Next, as an example, when the thermostat calls for cool, the fan output 6224 of the thermostat 6202 in FIG. 6A is usually activated automatically which causes the fan 6203 of HVAC 6200 to be turned on as well. Next, the MCU 5103 of FIG 5A or 5B records the duration of its input for AC compressor ON and AC compressor OFF over many previous cycles. Then, at the end of the next compressor ON cycle, the software makes its output 5125 (FIG 5A) which controls the HVAC fan, to stay on for a predicted period of time after the end of the compressor ON period. This continues, cycle after cycle, with the fan extension period based on the data from the previous compressor ON and OFF cycle(s) and the current ON cycle. The predicted fan extension run time may be computed by the software that uses the data of the compressor ON, OFF and ON durations of the previous cycle(s) and/or inputs from other sensors.

By monitoring the compressor ON time and compressor OFF time, the HVAC CHIP may obtain an indication of the difference between the room temperature and the outside air temperature and the rate at which the room is heating up after the compressor is OFF.

For example, if the outside temperature is 100 degrees Fahrenheit (° F.) and the room set temperature is 75 degrees F. (assuming a hysteresis of +/−1 degrees ° F.), the compressor could be running for 20 minutes before the room reaches the 74 degrees F. (75° F.−1° F. accounting for hysteresis) and then the compressor goes to OFF, for 5 minutes, as an example. After the compressor is OFF, then the room will get heated up relatively fast due to the outside temperature of 100 degrees F. Thus, when the room temperature gets to 76 degrees F. (75° F. +1° F., accounting for hysteresis), the compressor is ON again for, as an example, 10 minutes before it reaches the set temperature again. The fan time extension algorithm may be to take 10% of previous ON period, which is 2 minutes ("mins"), plus 20% of the previous OFF period, which is 1 min, plus 20% of the current ON period which is 2 mins, totaling 5 mins, which would mean to extend the fan run for 5 mins at the end of the current compressor ON time. However, if the outside temperature is only 85 degrees F, then it may take longer for the room to be heated up to 76 degrees F. In this case, the compressor OFF time is, as an example, 7 minutes, while the compressor is ON again for 10 mins after that, as an example. Thus, the algorithm for the fan extension at the end of this current 10 min compressor ON time may be 2 min plus 1.4 min plus 2 min, totaling 5.4 minutes. By measuring the compressor ON time, and compressor OFF time, the HVAC CHIP can estimate the temperature difference between the outside air and the room air, and the rate at which the room gets heated up after the compressor is OFF, taking into account other temperature changing activities in the room, and thus, how long the fan extension run time should be. Thus, shorter fun extension run times may apply when the difference between the room temperature and the outside air temperature is greater, and vice versa.

If the HVAC's cooling elements have been operating continuously for a period of time (e.g., 20-30 minutes), the HVAC CHIP may cause them to shut down for a short period of time with the fan still running (e.g., 3-5 minutes) to harness the stored energy left in the water condensed on the cooling coil. This continuous run period before the compressor is made to rest can be fixed or variable based on inputs from the thermostats and at least one of the host of sensors inputs into the MCU 6218. The compressor rest duration can also be made a fixed time length or a variable time length based on inputs from the thermostats and at least one of the host of sensors inputs into the MCU 6218.

As will be described further hereinafter, a new plug and play energy saving controller HVAC CHIP may include a low-cost temperature sensor or probe 6216 of FIGS 6A and 6B embedded into its encapsulated enclosure such that only the small probe sticks out of the encapsulation. This embedded temperature sensor may allow the HVAC CHIP to autonomously determine where it has been installed along the wiring path between the thermostat and the air handler unit, and may allow the HVAC CHIP to easily bypass the energy savings functions when the outside air temperature is at its extremes, for example, during heat waves or cold fronts periods in order to prevent discomfort to the occupants of the conditioned space.

As another example, a remote temperature sensor (not shown) may be installed in association with the HVAC CHIP to sense the temperature of the outside air. The HVAC CHIP can be installed inside the house next to the thermostat, at the air handler in the garage, attic, or outside the building on the roof for roof top units (RTU). If the HVAC CHIP is installed inside the house, a remote temperature probe may be installed outside the house to send the information to the HVAC CHIP by, for example, RF signal.

As another example, a humidity sensor (not shown) may be installed in in association with the HVAC CHIP to sense the humidity of the outside air if the HVAC CHIP is installed at the roof top, or the inside room air if the HVAC CHIP is installed inside the building. During the summer, in some months and some parts of the country, the humidity could be, for example, over 75 percent. Since the energy saving feature of the HVAC CHIP is based on the recovery of latent energy from evaporating away the water condensed onto the cooling coil, when the humidity is very high, the condensed water cannot be evaporated away. In addition, blowing high humidity air into the room with the compressor off could be uncomfortable for many people. Therefore, it would be desirable to install a humidity sensor in the HVAC CHIP to bypass the energy saving features if the outside humidity is, for example, above 75% or the inside humidity is, for example, above 65%. This bypass feature can be factory programmed or user programmed, depending on the user's choice.

Again, the energy savings that the HVAC CHIP system may provide may work by extending the fan run time and/or forcing the compressor to have a short rest after running for a certain period of time, to take advantage of the latent energy from evaporation of the water condensed on the compressor cooling coil. During the heat cycle, it extends the fan run time after the heater element has shut off, to take advantage of residual energy left in the heating element. However, as previously discussed, when the outdoor temperature is at its extremes, the above techniques may cause discomfort to the user, because the air coming from the HVAC may be too hot or too cold. Installation of a low-cost temperature sensor to the air handler unit, configured to automatically determine if temperatures outside are at its extremes, may again bypass the energy saving feature during those times.

As another example, a new plug and play energy saving controller HVAC CHIP may include a Wi-Fi enabled circuit device for open automated demand response (ADR)capability or normal demand response (DR) capability, thus eliminating the cumbersome, challenging and/or expensive task of replacing the entire thermostat, while still accomplishing the goal of the DR/ADR to save energy. As another example, in addition to providing a Wi-Fi enabled circuit device for open automated demand response capability, the new plug and play HVAC CHIP energy saving controller may provide a circuitry for ensuring energy efficient operation of the HVAC system outside of a demand response occurrence, thus further saving energy.

The apparatus and methods disclosed herein are suitable for split type central HVAC's or independent heater and compressor systems.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regards to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. An energy saving controller for an air handler for conditioning air of a space, the air handler having a heater and a dual speed fan adapted to switch between a first speed and a second higher speed at least twice in a heating cycle via a gas furnace controller, the energy saving controller being configured to be mounted between a thermostat and the gas furnace controller, and comprising:
   a plurality of input terminals configured to connect to a corresponding plurality of thermostat output terminals and receive thermostat output signals from the thermostat;
   a microcontroller connected to the plurality of input terminals and being configured to:
      receive the thermostat output signals,
      process the thermostat output signals into a set of revised energy saving signals; and
      cause the gas furnace controller to alternate between the first speed and the second higher speed to mimic a behavior of a variable speed fan; and
   a plurality of drivers connected to the microcontroller and also connected to a plurality of relays, the plurality of drivers being configured to receive the set of revised energy saving signals from the microcontroller and to use the set of revised energy saving signals to actuate the plurality of relays;
   wherein the plurality of relays is configured to actuate the dual speed fan or the compressor via a plurality of energy saving controller output terminals;
   a power source for powering the plurality of relays, the microcontroller, and the plurality of drivers; and
   wherein the alternation between the first speed and the second higher speed is caused by:
      defaulting to making electrical contacts with and provide line voltage to a first fan speed terminal to run the dual speed fan at the first speed, and,
      when the second higher speed is needed, energizing a control coil of the air handler at least twice over the heating cycle, the control coil being connected to a two-pole contactor configured to break the electrical contacts with the first fan speed terminal and make the electrical contacts with and provide line voltage to a second higher fan speed terminal to run the dual speed fan at the second higher speed; and
   a temperature sensor embedded in the energy saving controller, the temperature sensor being configured to provide temperatures detected at the installation location of the energy saving controller to the microcontroller;
   wherein the microcontroller is further configured to:
      determine that the installation location is inside of the space if the detected temperatures follow a pattern of rising when the heating cycle is on or a pattern of falling when a cooling cycle is on, and cause the alternation; or
      determine that the installation location is outside of the space if the temperature changes do not follow the pattern of rising when the heating cycle is on or the pattern of falling when the cooling cycle is on, and bypass the alternation when a temperature detected by the temperature sensor is higher than a first predetermined temperature, or when a temperature detected by the temperature sensor is lower than a second predetermined temperature.

2. The energy saving controller of claim 1, wherein the alternation between the first fan speed and the second higher fan speed is determined by monitoring by the microcontroller of ON and OFF durations of the first fan speed and the second higher fan speed in at least one previous cycle and in a current cycle, and basing the alternation on the monitored durations.

3. The energy saving controller of claim 1, wherein the alternation between the first fan speed and the second higher fan speed occurs at variable intervals of time which are determined by analysis by the microcontroller of the temperatures detected by the temperature sensor.

4. The energy saving controller of claim 1, wherein the alternation between the first fan speed and the second higher fan speed occurs at an equal interval of time.

5. The energy saving controller of claim 4, wherein the equal interval of time is two minutes.

6. The energy saving controller of claim 4, wherein the alternation between the first fan speed and the second higher fan speed occurs at a variable length of time.

7. The energy saving controller of claim 1, wherein the first predetermined temperature is 120 degrees Fahrenheit.

8. The energy saving controller of claim 1, wherein the second predetermined temperature is −40 degrees Fahrenheit.

9. The energy saving controller of claim 1, wherein the outputted floating state signal is outputted to control the compressor, the heater, or the fan via the plurality of energy saving controller output terminals.

10. The energy saving controller of claim 1, further comprising a floating state detector connected to the plurality of input terminals, the floating state detector being configured to detect when a floating state signal is outputted by the thermostat; and the microcontroller being connected to the floating state detector and being further configured to process the floating state signal into an OFF state.

11. An energy saving controller for an air handler for conditioning air of a space, the air handler having a dual speed fan adapted to switch between a first speed and a second higher speed at least once in a heating cycle via a gas furnace controller and at least a member of a group consisting of a heater and a compressor, the energy saving controller being configured to be mounted between a thermostat and the gas furnace controller, and comprising:
a plurality of input terminals configured to connect to a corresponding plurality of thermostat output terminals and receive thermostat output signals from the thermostat;
a microcontroller connected to the plurality of input terminals and being configured to:
receive the thermostat output signals,
process the thermostat output signals into a set of revised energy saving signals; and
cause the gas furnace controller to alternate between the first speed and the second higher speed to mimic a behavior of a variable speed fan;
a plurality of drivers connected to the microcontroller and also connected to a plurality of relays, the plurality of drivers being configured to receive the set of revised energy saving signals from the microcontroller and to use the set of revised energy saving signals to actuate the plurality of relays;
wherein the plurality of relays is configured to actuate the dual speed fan or the compressor via a plurality of energy saving controller output terminals;
a power source for powering the plurality of relays, the microcontroller, and the plurality of drivers; and
a temperature sensor embedded in the energy saving controller, the temperature sensor being configured to provide temperatures detected at the installation location of the energy saving controller to the microcontroller;
wherein the microcontroller is further configured to:
determine that the installation location is inside of the space if the detected temperatures follow a pattern of rising when the heating cycle is on or a pattern of falling when a cooling cycle is on, and cause the alternation; or
determine that the installation location is outside of the space if the temperature changes do not follow the pattern of rising when the heating cycle is on or the pattern of falling when the cooling cycle is on, and bypass the alternation when a temperature detected by the temperature sensor is higher than a first predetermined temperature, or when a temperature detected by the temperature sensor is lower than a second predetermined temperature.

12. The energy saving controller of claim 11, wherein the first predetermined temperature is 120 degrees Fahrenheit.

13. The energy saving controller of claim 11, wherein the second predetermined temperature is −40 degrees Fahrenheit.

14. The energy saving controller of claim 11, wherein the alternation between the first fan speed and the second higher fan speed occurs at variable intervals of time which are determined by analysis by the microcontroller of the temperatures detected by the temperature sensor.

15. The energy saving controller of claim 11, further comprising a floating state detector connected to the plurality of input terminals, the floating state detector being configured to detect when a floating state signal is outputted by the thermostat; and the microcontroller being connected to the floating state detector and being further configured to process the floating state signal into an OFF state.

16. An energy saving controller for an air handler for conditioning air of a space, the air handler having a dual speed fan adapted to switch between a first speed and a second higher speed via a gas furnace controller and at least a member of a group consisting of a heater and a compressor, the energy saving controller being configured to be mounted between a thermostat and the gas furnace controller, and comprising:
a plurality of input terminals configured to connect to a corresponding plurality of thermostat output terminals and receive thermostat output signals from the thermostat;
a microcontroller connected to the plurality of input terminals and being configured to:
receive the thermostat output signals,
process the thermostat output signals into a set of revised energy saving signals; and
cause the gas furnace controller to alternate between the first speed and the
second higher speed to mimic a behavior of a variable speed fan; and
a plurality of drivers connected to the microcontroller and also connected to a plurality of relays, the plurality of drivers being configured to receive the set of revised energy saving signals from the microcontroller and to use the set of revised energy saving signals to actuate the plurality of relays;
wherein the plurality of relays is configured to actuate the dual speed fan or the compressor via a plurality of energy saving controller output terminals;
a power source for powering the plurality of relays, the microcontroller, and the plurality of drivers; and
means for causing the alternation between the first speed and the second higher speed wherein line voltage is provided to either a first fan speed terminal of the dual speed fan or a second higher fan speed terminal of the dual speed fan.

17. The energy saving controller of claim 16, wherein the alternation between the first fan speed and the second higher fan speed is determined by monitoring by the microcontroller of ON and OFF durations of the first fan speed and the second higher fan speed in at least one previous cycle and in a current cycle, and basing the alternation on the monitored durations.

18. The energy saving controller of claim 16, wherein the alternation between the first fan speed and the second higher fan speed occurs at equal intervals of time.

19. The energy saving controller of claim 18, wherein the equal interval of time is two minutes.

20. The energy saving controller of claim 16, further comprising a floating state detector connected to the plurality of input terminals, the floating state detector being configured to detect when a floating state signal is outputted by the thermostat; and the microcontroller being connected to the floating state detector and being further configured to process the floating state signal into an OFF state.

* * * * *